(12) United States Patent
Daniell et al.

(10) Patent No.: US 8,980,405 B2
(45) Date of Patent: Mar. 17, 2015

(54) AUTOMATED LENTICULAR PHOTOGRAPHIC SYSTEM

(75) Inventors: Stephen S. Daniell, Northampton, MA (US); Steven M. Spiro, Chappaqua, NY (US); David Whelan, Cincinnati, OH (US); James Anderson, New York, NY (US); Daniel L. Lau, Lexington, KY (US)

(73) Assignee: Tracer Imaging LLC, White Plains, NY (US)

( * ) Notice: Subject to any disclaimer, the term of this patent is extended or adjusted under 35 U.S.C. 154(b) by 446 days.

(21) Appl. No.: 13/294,447

(22) Filed: Nov. 11, 2011

(65) Prior Publication Data

US 2012/0125217 A1    May 24, 2012

Related U.S. Application Data

(60) Provisional application No. 61/413,421, filed on Nov. 13, 2010.

(51) Int. Cl.
| | |
|---|---|
| *B32B 3/00* | (2006.01) |
| *B41M 3/00* | (2006.01) |
| *G02B 27/22* | (2006.01) |
| *H04N 13/04* | (2006.01) |
| *B29D 11/00* | (2006.01) |
| *G11B 23/40* | (2006.01) |

(52) U.S. Cl.
CPC .......... *B41M 3/003* (2013.01); *B29D 11/00278* (2013.01); *G02B 27/2214* (2013.01); *G11B 23/40* (2013.01); *H04N 13/0404* (2013.01)
USPC ........................................ 428/195.1; 353/32

(58) Field of Classification Search
CPC ..................... G02B 27/2214; B29D 11/00278; G11B 23/40; H04N 13/0404
USPC ........................................................ 428/195.1
See application file for complete search history.

(56) References Cited

U.S. PATENT DOCUMENTS

| | | | |
|---|---|---|---|
| 5,408,294 A | 4/1995 | Lam | |
| 5,424,553 A | 6/1995 | Morton | |
| 7,457,039 B2 * | 11/2008 | Raymond et al. ............. | 359/619 |
| 2002/0198724 A1 | 12/2002 | Peterson | |
| 2007/0273140 A1 | 11/2007 | Bar-Yona | |
| 2007/0285804 A1 | 12/2007 | Raymond et al. | |
| 2010/0098340 A1 | 4/2010 | Zomet et al. | |

FOREIGN PATENT DOCUMENTS

| | | |
|---|---|---|
| WO | WO 96-26872 | 9/1996 |
| WO | WO 2006-054284 | 5/2006 |

* cited by examiner

*Primary Examiner* — Elizabeth Mulvaney
(74) *Attorney, Agent, or Firm* — Leason Ellis LLP

(57) ABSTRACT

An automated lenticular photographic system includes an interface that permits a user to upload image files and image processing and printing equipment that is in communication with the interface for receiving the uploaded image files and processing the uploaded image files to create an interlaced print image file that is used to produce an interlaced print sheet containing interlaced print images. A pair of registration marks is formed on the interlaced print sheet outside of borders of the interlaced print images to assist in aligning the interlaced print sheet with a lenticular lens sheet. A registration system detects whether the lenticular lens sheet is off-centered and skewed relative to the interlaced print sheet.

8 Claims, 13 Drawing Sheets

AUTOMATED LENTICULAR PHOTOGRAPHIC SYSTEM

CROSS-REFERENCE TO RELATED APPLICATION

The present application claims priority to and the benefit of U.S. patent application Ser. No. 61/413,421, filed Nov. 13, 2010, which is hereby incorporated by reference in its entirety.

TECHNICAL FIELD

The present invention relates to lenticular images and, more particularly, to automated production systems that place interlaced imagery in a state of registration with lenticular lens sheet.

BACKGROUND

Lenticular images typically employ cylindrical lens arrays which have been extruded and cut into standard size sheets. In current practice using conventional techniques, these sheets are usually reverse-printed on their flat, unlenticulated side with a specially prepared interlaced image. Because the lens arrays allow the image to vary with the angle of view, lenticular images can be given diverse properties of apparent depth and animation. These properties have long been found to be highly effective in advertising, marketing, and promotion. In addition, such qualities are perceived as having a degree of interest and value apart from the initial visual encounter.

Lenticular printing is a multi-step process consisting of creating a specially prepared lenticular image from at least two existing images, and then combining it with a lenticular lens sheet. Depending on the specifics of the image preparation, this process can be used to create various frames of animation (for a motion effect), offsetting the various layers at different increments or establishing differing angular views (for a 3D effect), progressively scaling a chosen locus within an image (for a zooming effect), or simply to show a set of alternate images which can appear to transform into each other. Once the various images are collected, they are processed into differing frame files, and then digitally combined into a single final file in a process called interlacing.

In this operation, each image is arranged into strips, which are then interlaced with one or more similarly divided images. Originally this integration was performed optomechanically, however, the interlacing process can now be performed digitally with great accuracy and repeatability.

These interlaced images are often printed on the back of a piece of plastic which has an array of lenses formed in the opposite side. These lenses are usually cylindrical in geometry, but elliptical and parabolic profiles have also been put in practice. Extrusion is the most common method for manufacturing the lens sheet, but film casting, embossing, and molding are also known. Historical practices are also known in which the lenses are formed using a layer of gelatin, lacquer, curable polymer, or other transparent material directly upon interlaced printed imagery. Lenses can be radial in geometry as well as linear, although radial lens elements are less often practiced. Methods of producing periodic image effects, such as moiré patterns or repeating icons, are understood to be attainable without precise interlacing. These optical products nevertheless share the conceptual and structural foundation of lenticular prints.

Offset printing directly to the flat rear surface of the polymer lenticular sheet is the most common current practice for volume production. However, images can nevertheless be printed independently on paper or white polymer film, and subsequently bonded to the plastic lens sheet. This practice is commonly followed when special formats or short runs are specified.

In any case, the alignment of the lenses with their corresponding interlaced image fields is critical to the success of the chosen optical effect. In offset printing, this alignment is achieved in elaborate trial set-up and make-ready operations. However, when the images are to be preprinted and laminated, the alignment of the image sheet and lens sheet in each instance is usually incumbent on a skilled operator. Because this critical step is time-consuming, error-prone, and therefore often cost-prohibitive, short runs and individual pictures have been largely excluded from the lenticular trade.

SUMMARY

The present invention relates to the printing of lenticular images and, more particularly, to an automated lenticular production system that places a preprinted interlaced print in a state of registration with lenticular lens sheet, monitors their relative position, and then fixes the print and lens sheet in that state of alignment.

An automated system can be provided for the assembly, alignment and adhesion of a lenticular image as part of a process to manufacture the ordered lenticular product. The system can include a protected environment to exclude contaminants and limit atmospheric variation. It may include automated operations for the transportation and cleaning of the component sheet materials. The automated system also has a number of components that ensure the proper alignment between the preprinted image (interlaced print) and lenticular lenses (lens sheet) that overlie the preprinted image.

As a matter of practice, it may be appreciated that the alignment and registration of lenticular lenses with a preprinted image is increasingly challenging as the lens pitch becomes smaller. Lenses must be parallel to the printed image raster, and each interlaced image band must also be exactly aligned with an associated lens.

The present invention provides a simple and compact alignment and registration indicator which exploits a conscientious difference in spatial frequency between a repeated image icon and the lenticular array. An indicator (registration mark) can be made so that is serves as an intuitive guide to any positional errors. When two indicators (registration marks) are used at opposite ends a printed sheet, very slight deviations from optimal alignment can be detected. Within the invention, the use of two oppositely located registration marks therefore enables the alignment of relatively large sheets of relatively fine pitch.

Advantageously, the registration mark can be reliably read by machine, as well as by a human operator. The optical alignment system is therefore suitable for either manual or robotically-assisted alignment. Because any deviation of the indicators is readily apprehensible, an automated system can be intuitively monitored by a human supervisor via a direct visual interface, such as camera sensor data enlarged on a graphic display. It may be appreciated that, while it may be convenient for a such a display to be mounted on or near the alignment system, it may also be useful to monitor one or more systems in the same manner from a remote location.

Additionally, by the use of a known finite lenticular magnification value, accommodation can be made for production circumstances in which the registration mark is not, or cannot be, located at the precise focal length of the lenses, as for example, when a film adhesive is provided with a temporary release liner.

In an automated implementation of the invention, an optical device, such as a camera, is aimed through the lenticular sheet to focus upon two specially devised targets (registration marks) located as substantially opposite ends of a lenticular lens sheet. The lenticulated sheet is placed in a temporary, roughly aligned position on top of the sheet carrying at least one preprinted, interlaced image between the targets. Mechanical guiding means such as tapered pins can assist in the preliminary alignment.

The lens sheet is then gripped, at least two locations, by a mechanical clamping device or the like. Each clamping device is connected to one or more actuators. The actuators are advanced or retracted based on information derived from the image of the targets received by the optical device. By conscientiously imparting relative motion to the actuators, the gripped lens sheet is shifted until it is in precise alignment with the preprinted interlaced image content.

Ideally, this alignment should eliminate skewing of the lenses relative to the interlaced imagery, and should furthermore position each lens in the desired position relative to the underlying image fields. A typical anticipated centered viewpoint would imply that alignment commonly be performed so that the centermost elongate interlaced image field, in each image in the layout, would be bisected by the optically normal plane of an overlying lenticular lens. This optical condition imparts special layout requirements when multiple images are laid out on a single sheet. These requirements are readily accommodated in the present system.

The automated system also includes other features to ensure the proper alignment between the two sheets and to secure a partial bond therebetween as a precursor to a final lamination process where a laminated lenticular product is formed.

These and other aspects, features and advantages shall be apparent from the accompanying Drawings and description of certain embodiments of the invention.

DETAILED DESCRIPTION OF CERTAIN
EMBODIMENTS OF THE INVENTION

The present invention enables individual retail or trade customers to obtain lenticular products. These customers may compose, edit, revise, and preview lenticular products from a location apart from the fabrication facility. An interface, whether local or remote, can permit a user to upload traditional images (digital image files) that are then delivered to at least one processing station where the uploaded images are processed into a lenticular product. The lenticular product is then in turn delivered back to the user. At the interface, the user can be presented with a number of different lenticular products from which to choose.

The user may browse the uploaded photos with physical or graphical tools, such as forward and back arrows, etc. To select individual photos, the user simply makes a selection using a keyboard or more likely, simply touches the desired photo which results in the photo being highlighted to indicate it is a chosen/selected photo. After making selections, the user is provided with a preview of the lenticular product that has been previously selected.

Once the order is placed, a data file is sent from the user interface to an image processing/printing device. The data file not only includes the selected photos (selected uploaded images) but it also includes other user (consumer) identifying information as well as control and instruction data, etc. At the downstream processing station, the data file is received and further processed in order to produce the end lenticular product purchased by the user (consumer). For example, the received data file can be processed into an interlaced print file that can be stored in memory and then processed to form an interlaced print.

Figure 1:
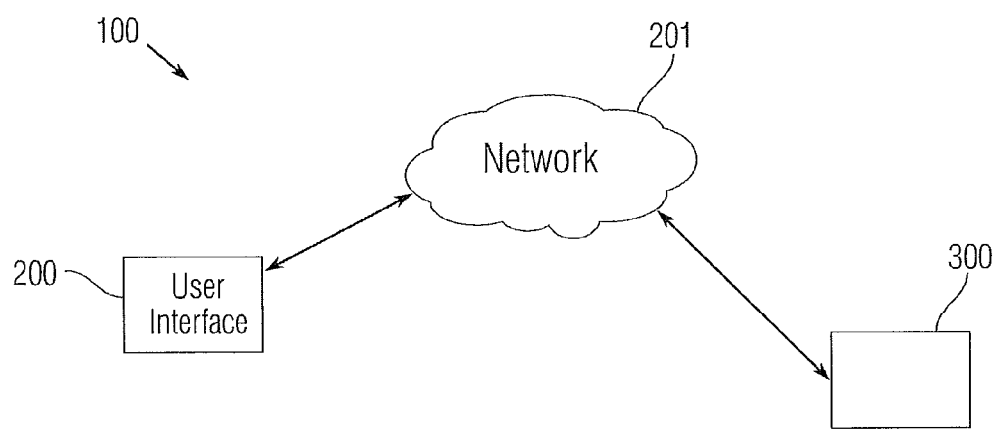
FIG. 1 illustrates the basic components of an automated lenticular photographic system according to one embodiment of the present invention.

FIG. 1 is a general schematic showing the basic components of an automated lenticular photographic system 100 according to one embodiment of the present invention. The system 100 generally includes a user interface 200 and a processing and production station 300 where a custom lenticular product is manufactured based on instructions, information and files provided by the user. The user interface 200 communicates with the processing and production station 300 using any number of different communication technologies, including communicating over a wireless network 201. For example and as shown in FIG. 1, the user interface 200 communicates with the station 300 over the internet. After manufacturing, the custom lenticular product is delivered to the user using traditional transportation means, such as by post or courier.

It will also be appreciated and understood that FIG. 1 broadly illustrates exemplary stations and components that are part of the system 100 of the present invention; however, additional stations, such as one or more servers, image processing stations, printing stations, cutting stations, packaging stations, etc. can be provided as described below. It will also be appreciated that one or more of the various stations can be located in different physical locations relative to the other components/stations or multiple stations can be at one physical location.

For example, the information inputted by the user at the user interface 200 can be delivered to a first processing station where the input information, including uploaded images, is stored in an unedited form. As described below, this unedited information is then further processed (e.g., at a different processing station) to produce an interlaced print image file based on the input information, and it is this interlaced print image file that is delivered to a print station where an interlaced print is produced.

A user interface location is simply a location where a user can enter instructions, upload files, etc. that are later processed for the manufacture of the custom lenticular product. This location can either be at a public location, such as at a kiosk at a retail store, or it can be at a private location, such as personal computer at a personal residence. In accordance with the present invention, the user interface 100 can be any number of different types of devices including but not limited to standalone units, such as a kiosk, or a personal computer or mobile device that is connected to a network, such as the internet 150.

In accordance with one embodiment of the present invention, the user interface 100 is in the form of an in-store kiosk or a kiosk that is located in some other location. For example, the kiosk 100 can be located in a retail store, such as a large department store or pharmacy, where traditional photo kiosks are typically located. In fact, it will be appreciated that existing, traditional kiosks can be retrofitted to offer the service described herein by simply adding additional software to run the kiosk. In other words, software can be installed, relatively easy, on a nationwide network of kiosks in order to convert the kiosks to offer the service described herein in accordance with the present invention.

Figure 2:
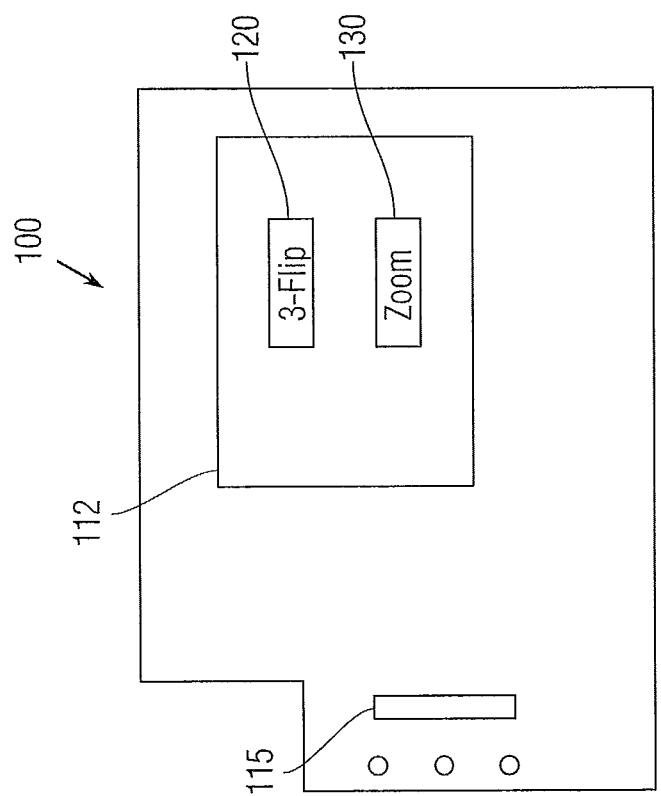
FIG. 2 is a front elevation of an exemplary kiosk user interface and display.

As shown in FIG. 2, the kiosk includes a display 112 which is typically in the form of an interactive screen. In one embodiment, the display 112 is part of a touch screen system where the user makes selections and inputs data by touching certain areas of the screen when prompted. Slot 115 receives media (e.g., a memory card) containing the images.

The software installed on the kiosk can be written so that a user of a traditional photo kiosk is given the option of ordering and producing a lenticular product. For example, an icon or the like (e.g., a corporate name or trademark or product name, etc.) can be displayed on a main page and once the user selects the icon, as by touching the icon image on the screen, the user is then shown a main home page specific to lenticular products. For example and as shown in FIG. 2, the user can be presented with a number of different lenticular products from which to choose and in the illustrated embodiment, two exemplary lenticular products that are presented are: (1) "3-Flip" as illustrated by icon/indicia 120 and (2) "Zoom" as illustrated by icon/indicia 130. These two lenticular products are described in more detail below. The user can choose the desired lenticular product by either using a keyboard and/or by touching the screen. After the user chooses the lenticular product, the user is then prompted and/or can make selections so as to upload and/or choose images from the uploaded images (e.g., an online photo album). For example, the user can insert into the slot 115 a memory card (e.g., an SD card) or a CD (compact disc) that contains photo images in the form of files (such as JPEG, TIFF, RAW, or DNG) that are stored on the media.

Figure 3:
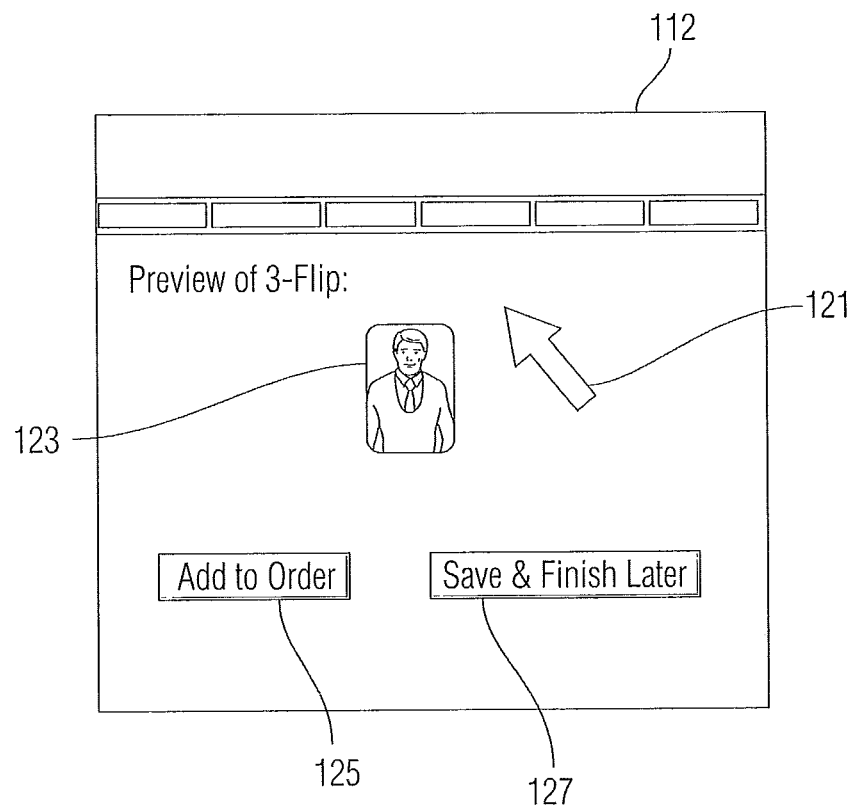
FIG. 3 is a screen shot of the kiosk showing steps to order a 3-Flip lenticular product.

As with traditional photo kiosks, the user can browse the uploaded photos with tools, such as forward and back arrows, etc. To select individual photos, the user simply makes a selection using a keyboard or more likely, simply touches the desired photo which results in the photo being highlighted to indicate it is a chosen/selected photo. As shown in FIG. 3, after making selections, the user is provided with a preview of the lenticular product that has been previously selected. For example, if the user selects 3-Flip, then a preview of a 3-Flip lenticular product is provided. As shown in FIG. 3, the user can move a tool 121, such as an arrow, to highlight and press a preview icon 123 and a preview image is generated (as represented by at least one of the uploaded photos). If the user wishes to purchase this customized lenticular product, the user can simply select the "Add to Order" button 125 which results in the lenticular product being stored in a cart. If the user is not yet ready for making a purchase, the user can select the "Save and Finish Later" button 127 and the customized lenticular product will be saved for a potential purchase at a later time. Much like any internet retail store, the user proceeds with purchasing the product by entering the cart and then entering user identification information, such as the user's full name, address, etc., as well as a means for payment.

As mentioned above, two types of lenticular products that can be offered for purchase are a 3-Flip image option and a Zoom image option. In the 3-Flip lenticular product, three images flip from one to another depending upon the viewing angle. A 2-Flip is where two images flip from one to the other. When the Flip image option is selected, the user selects Flip images from the uploaded images. An optional border and/or text can be provided. For example, the user can select a border icon and then follow different steps to view different border options. Finally, a preview can be generated and the user can proceed with purchase as discussed above.

Figure 4:
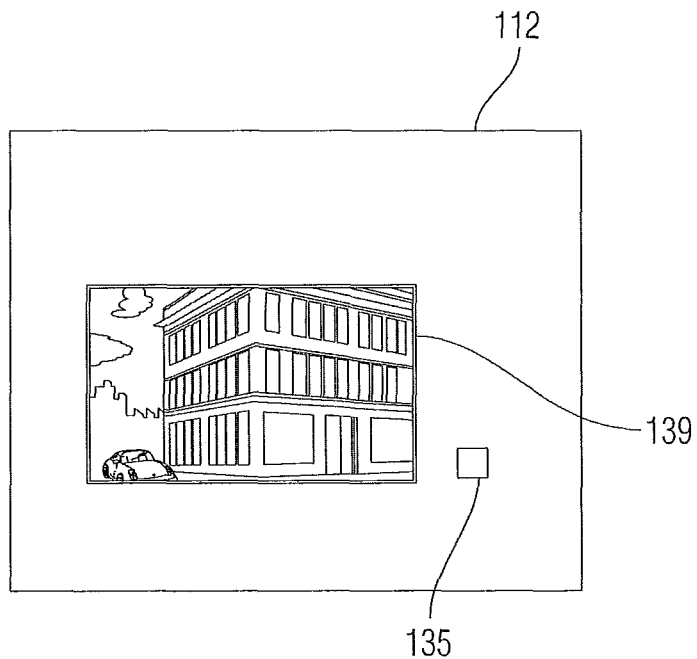
FIG. 4 is screen shot of the kiosk showing a Zoon lenticular product with a movable tool.

In the Zoom image option, one image zooms into an enlarged area as the viewing angle of the lenticular product is changed. For example, the basic image can be in the form of a team picture and the zoom aspect can zoom in on one of the players. When the Zoom image option is selected, a zoom image is selected from the uploaded images as shown in FIG. 4. A square or rectangular positioning tool 135 is positioned over the portion of the image 139 (photo) that is intended to be zoomed. The size of the tool 135 can be changed. An optional border and/or text can be provided. For example, the user can select a border icon and then follow different steps to view different border options. Finally, a preview can be generated and the user can proceed with purchase as discussed above.

In accordance with the present invention, the software that is part of the user interface (kiosk, PC, etc.) is configured so that it provides automated lenticular recommendations. In particular, the software improves the customer experience and increases sales of individualized lenticular products by being programmed so as to review the user's order and make and/or suggest changes that will optimize the lenticular product or give any error or warning messages to the user. Lenticular images have special requirements such that not all images translate effectively into every type of lenticular product. For example, a video sequence captured and uploaded by a customer can only include a finite number of frames which are free of motion blur. When a customer's source medium or media are anticipated to be suboptimal, prompts based on the qualified image set are made and electively presented to the retail client (user) in the form of a video preview. Other examples of automated lenticular recommendations include the substitution of a two or three phase flip image for a continuous animation, or a lenticular zoom image from a single technically qualified image.

In addition, the drag square/rectangular positioning tool 135 used in the Zoom image option, as discussed above, can vary in sized based on a resolution of the uploaded image (for example, a higher resolution image may allow zooms to a smaller relative area). The user selects the zoom positioning tool from a sidebar, toolbar, etc., and drags the positioning tool to the final zoom location. A user can be provided with a number of different sized positioning tools, e.g., a maximum of three; however, if the uploaded image is too small, the positioning tool will be disallowed and will not be presented.

Alternatively, the user interface 100 can be in the form of a website and in particular, a website of a retailer, such as a large department chain or pharmacy, or can be in the form of a website of an internet-based personal publishing service company that provides products and services that make it possible for consumers to upload, share and print photos. The process for uploading, selecting, previewing and placing an order is identical or similar to that described above in the discussion of a photo kiosk application and therefore, these steps will not be described again in detail.

It will also be understood that the user interface 200 can also be in the form of a handheld device that supports and includes the necessary functionality. For example, the user interface 100 can be portable, and may in such as case be in the form of a PDA or smartphone. Positioning tools used to establish cropping coordinated may accordingly be alphanumeric keys, arrow keys, or capacitive devices such as wheels, pads, or touch screens.

Once the order is placed, a data file is sent either from the in-store kiosk or from the retailer's website to another location, such as the processing station 300. The data file not only includes the selected photos (selected uploaded images) but it also includes other user (consumer) identifying information as well as control and instruction data, etc. At the processing station 300, the data file is received and further processed in order to produce the end lenticular product purchased by the user (consumer). For example, the received data file can be processed into an interlaced print file that can be stored in memory and then processed to form an interlaced print as discussed herein.

Predesigned lenticular effects can benefit from expert design and optimized graphics. Templates which include intentionally designed lenticular graphics can therefore enhance the perceived value of a lenticular product. Furthermore, these effects can make the finished image more attractive for composition from multiple sources, seasonal customization, personalization, reinforcement of the image theme, or gift-giving. Templates can also be used to sell and track commercially licensed imagery.

In yet another aspect, the present invention can be designed to provide a compact lenticular image file set that provides a number of advantages as discussed herein. Lenticular images represent multiple viewpoints to the viewer. The underlying interlaced images can be composed from any series of related or unrelated images. High-quality lenticular prints can utilize sixteen or more images. This file set can be very large and can require prohibitive bandwidth. Furthermore, retail kiosks rarely include processing capable of lenticular interlacing. In view of the foregoing, the software of the present invention is configured so that images be scaled to optimal size prior to electronic transfer from the user interface (kiosk) 200 to downstream equipment, such as downstream servers, image processing and/or printing stations (e.g., stations 300). The minimized files (scaled down) can then be directly interlaced at a remote location, such as processing station 300. When appropriate, file minimization may include foreknowledge of pitch of the lenses and the dimension of the print, so that the number of pixels in the relevant axis can be resampled to be effectively commensurate with the number of anticipated lenses. The minimized file set can also be tagged with image filtering and processing instructions, adjustment values, customer data, or any other useful order data. Accordingly, the minimized file includes unedited data and images that are sent as a file to another location for storage and/or further processing (e.g., creation of an interlaced print image file).

As previously mentioned, the processing station 300 can include one or more stations that can be at the same physical location or they can be located at different physical locations. The processing station 300 includes image processing and printing equipment that is configured so that the image(s) and data file(s) received from the user interface 200 is further processed to create an interlaced print image file, based on the customer's order. The interlaced print image file can be stored and is then sent to printing equipment that is configured to print lenticular images.

In accordance with one aspect of the present invention, multiple images can be laid out on a single sheet. In the practice of the invention it has been found useful to designate a specific dimensional margin separating the images. An interlaced image is made up of a series of image fields, each image field ultimately corresponding to a single lens. In prior practice of the lenticular art, it is understood that a very slight progressive displacement of the image fields from the lens footprint is generally optimal, in order to direct the magnified lenticular image data to a finite viewing distance.

The specific outward shift is generally derived through trigonometry and a prior knowledge of the lens material's refractive properties, or computer modeling with software, or through empirical experimentation. Within the invention, it has been discovered that neighboring images may be advantageously laid out so that the last complete image field of each image can be set apart from its neighbor by a specific fractional value less than the common lens pitch.

For example, an image provided with a 400 micron wide image field may be separated from its neighbor's last complete image field by 320 microns. This value may also be the sum of the any multiple of the image field width and the spacer separation, e.g., these sums in the aforementioned case being 720µ, 1120µ, 1520µ, etc. Unless the image division has a further purpose, it is, as a rule, preferable to minimize the separation between images.

This conscientious arrangement permits each individual image to be separately optimized for a electable viewing distance and location, while allowing several images carried on a common substrate to be simultaneously aligned to a monolithic sheet of lens material. As image sizes, viewing distances, and viewing distances might foreseeably vary among the images laid out on a single sheet, so the appropriate separation might vary accordingly. It may generally be appreciated that whenever plural images are arranged in a neighboring fashion in the axis transverse to the lenses, that the images should optimally not be interlaced as a unit, but instead should be discretely interlaced and located with spacings commensurate with their anticipated viewing conditions.

Image separation need not be symmetrical, but should instead accord with the anticipated requirements of the neighboring images. The neighboring lenticular mages may be of differing sizes and orientations, and still accord with the scope and intent of the present invention. For example, handheld lenticular animation prints are typically devised with lenses arranged horizontally, while a stereoscopic effect requires vertical lenses. The resulting printed sheets, however interlaced and composed, can be arranged in a stack for further processing, as discussed below.

Figure 5:
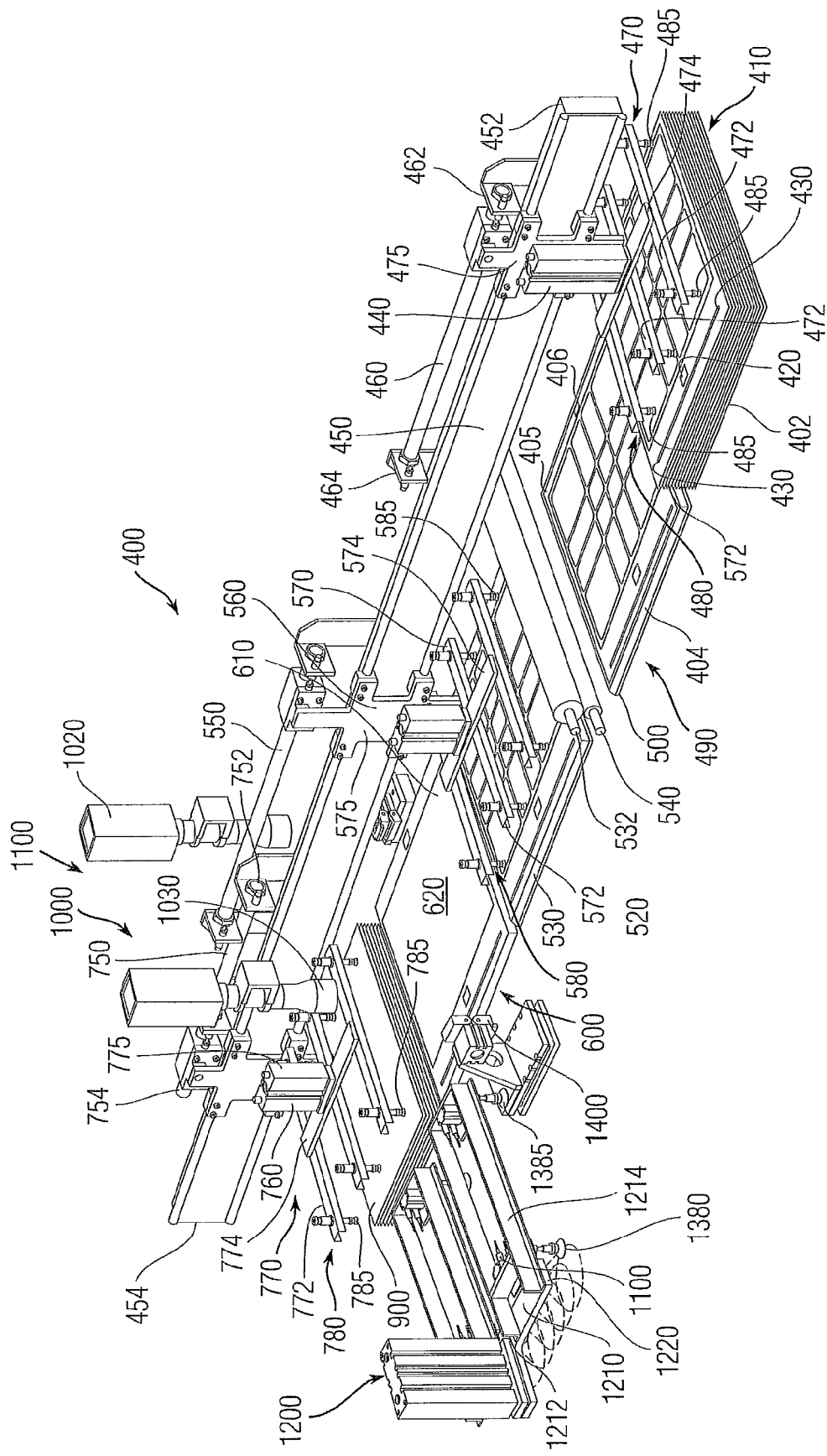
FIG. 5 is a side perspective view of an automated system for the assembly, alignment and adhesion of a lenticular product according to a first embodiment.
Figure 6:
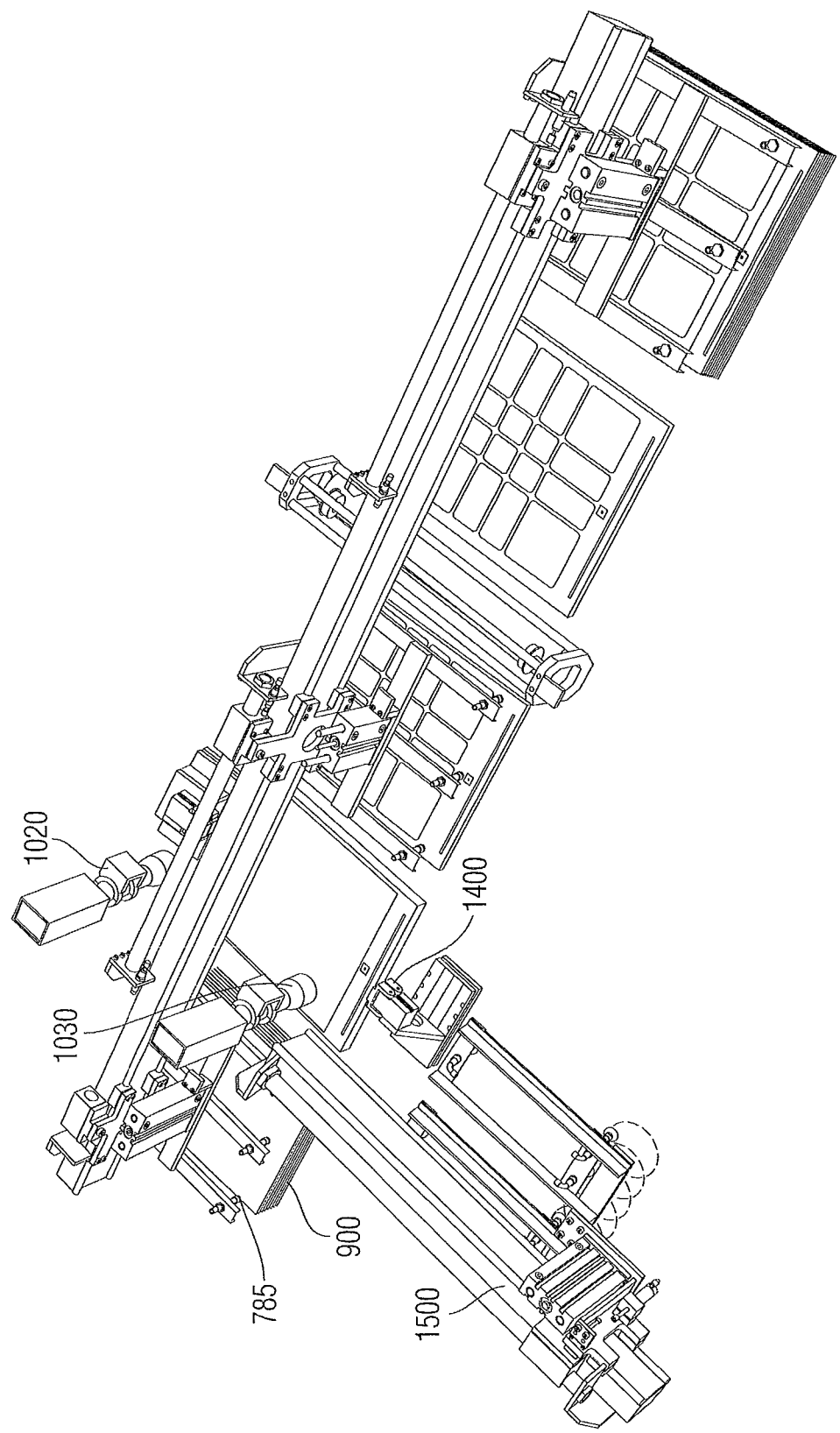
FIG. 6 is a top perspective view of an automated system for the assembly, alignment and adhesion of a lenticular product.
Figure 7:
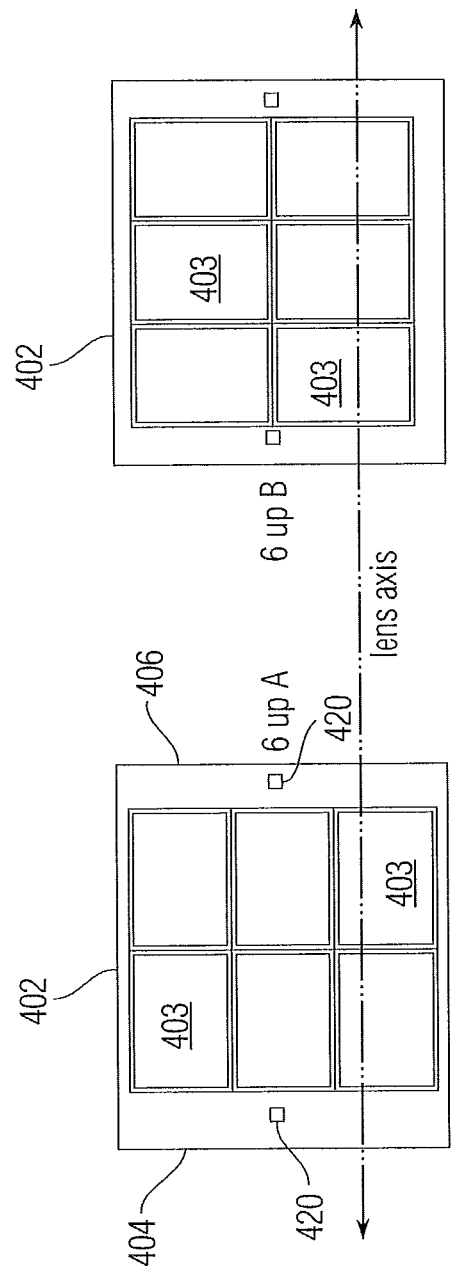
FIG. 7A is a top plan view of print sheet including a plurality of interlaced prints arranged in a first orientation.
FIG. 7B is a top plan view of a print sheet including a plurality of interlaced prints arranged in a second orientation.

Now referring to FIGS. 5-6, the processing station 300 according to one embodiment of the present invention includes an automated system 400 for the assembly, alignment and adhesion of a lenticular image (lenticular product). FIG. 5 is a perspective view of that automated system 400 which itself is formed of a number of individual components and/or stations. For example, the automated system 400 includes a first station 410 for storing a stack of interlaced print sheets 402. As mentioned above and shown in FIGS. 7A and 7B, each interlaced print sheet 402 can include more than one interlaced image 403 (e.g., each sheet can contain 6 interlaced print images as shown in different orientations in FIGS. 7A and 7B). The interlaced print sheet 402 is typically square or rectangular in shape and at least includes a first side 404 and an opposing second side 406. In the illustrated embodiment, the sheet 402 has a generally square shape with the sides 404, 406 opposite one another. As discussed in more detail below, a pair of registration marks 420 is formed on the sheet 402 outside of the borders of the interlaced print images and more particularly, one registration mark 420 is formed along the side 404 and the other registration mark 420 is formed along the other side 406 directly opposite to one another. The sheet 402 also preferably includes an adhesive locator mark 430 (FIG. 5) that is subsequently used as a guide for laying down adhesive along one side 406 of the sheet 402 as described below. As shown in FIG. 5, the adhesive locator mark 430 can be in the form a line that is visually identifiable and is located between the registration mark 420 and the edge of the side 404, 406. All of the sheets 402 are arranged uniformly in the stack in that all of the registration marks 420 of the various sheets 402 overlie one another and are aligned and similarly, the locator marks 430 of the various sheets 402 overlie one another. The sheets 402 are arranged in the stack with the print side facing up.

The first station 410 is not only where the stack of sheets 402 is located but also is a location where a sheet 402 is selectively transported from the first station 410 to another station at a downstream location. The automated system 400 includes an automated and controllable means for transporting one sheet 402 from one location to another location. For example, the transportation means can be in the form of a first controllable movable member, such as a robotic carriage 440, that moves along a main track 450. The main track 450 has a first end 452 and an opposing second end 454 with the first end 452 being located at the first station 410. In addition to the main track 450, there is a first secondary track 460 on which the carriage 440 moves. The first secondary track 460 has a first end 462 and an opposing second end 464 with the first end 462 being located at the first station 410. In the illustrated embodiment, the first secondary track 460 is located at the top of the main track 450 and has a length that is less than the main track 450 such that the first secondary track 460 only extends along a portion of the main track 450.

In the illustrated embodiment, the first carriage 440 is operatively coupled to both the first secondary track 460 and the main track 450 and has a range of motion based on the length of the first secondary track 460 in that the ends 462, 464 of the secondary track 460 define the limits of the travel of the first carriage 440. The main track 450 and the first secondary track 460 can include rails on which the carriage is driven. The first carriage 440 is coupled to the secondary track 460 at a top portion thereof and is coupled to the main track 450 along its center and bottom portions. The first carriage 440 includes a frame 470 that supports a sheet pickup mechanism 480. The frame 470 includes a plurality of parallel support members 472 and a cross bar 474 that is coupled to the parallel support members 472. A coupling member 475 couples the frame 470 to a rail that is part of the main track 450.

The sheet pickup mechanism 480 can be in the form of a vacuum system that includes a plurality of vacuum ports 485 that are arranged and positioned along the frame 470 and more specifically, about the support members 472. In the illustrated embodiment, there are six (6) vacuum ports 485 that are located at each end of each support member 472. Each vacuum port 485 extends downwardly from the frame and includes a sheet engaging portion (e.g., a cup shaped vacuum member) that contacts the sheet 402. The vacuum ports 485 are operatively connected to a vacuum source so that a vacuum can be provided in the vacuum ports 485 when a controller is actuated. The vacuum ports 485 are arranged so that each corner of the sheet 402 has a corresponding vacuum port 485 positioned thereover and additional vacuum ports 485 can be located centrally over the sides 404, 406 of the sheet 402 proximate the registration marks 420.

The sheet pickup mechanism 480 is part of a robotic system and therefore it can be moved in a controlled manner. For example, the frame 470 can be at least moved in an up and down manner to permit the vacuum ports 485 to move between a retracted position and an extended position where the vacuum ports 485 are brought into a proximate relationship with the underlying sheet 402. Any number of different types of actuators can be used to effectuate the movement of the frame 470 between multiple, different positions. When each vacuum port 485 is actuated, negative pressure is formed in each vacuum port 485 causing and due to the close proximity between the sheet 402 and the frame 470, the sheet 402 is drawn toward (lifted up from the underlying sheets 402) and held in place by the vacuum. Once the sheet 402 is held by the vacuum ports 485 of the frame 470, movement of the first carriage 440 along the first secondary track 460 and the main track 450 results in the sheet 402 being capable of being lifted and moved from one location (station) to another location (station).

It will be appreciated that the pickup mechanism 480 can include sensors of the like to detect the distance between the sheet 402 and the vacuum ports 485. In addition, in one embodiment, the support members 472 of the frame 470 are adjustable based on the dimensions of the sheet 402. For example, the support members 472 can be adjusted so that the vacuum ports 485 are positioned over the corners of the sheet 402.

For example, the held sheet 402 can be moved to a second station 490 that is located along both the first secondary track 460 and the main track 450. In particular, the second station 490 is located at the second end 464 of the first secondary track 460. The second station 490 includes a movable vacuum platen 500 that includes a top surface 510 that faces the main track 450 and the first secondary track 460. The vacuum platen 500 can be in the form of a plate or substrate that moves linearly along a track (not shown). The platen 500 is constructed so that it includes a plurality of vacuum openings (not shown) that are formed along the top surface 510. The platen 500 is operatively connected to the vacuum source so that when the vacuum is actuated, a vacuum is generated along the top surface 510 for holding down the sheet 402 on the top surface 510.

To position one sheet 402 on the top surface 510, the first carriage 440 is driven toward the second end 464 of the first secondary track 460 until the frame 470 is located above the top surface 510 of the platen 500. The frame 470 can then be moved downward toward the platen 500 to position the sheet 402 in close proximity to the top surface 510. The vacuum in the vacuum ports 485 is then eliminated resulting in the sheet 402 being released and moving toward the platen 500. The vacuum that is associated with the platen 500 can be actuated prior to the vacuum ports 485 being disconnected from the vacuum so as to assist in pulling the sheet 402 onto the top surface 510 of the platen 500.

Once the first carriage 440 releases the sheet 402, the first carriage 440 moves back to the first station 410 where the first carriage 440 is positioned back over the stack of sheets 402 and frame 470 can be actuated so that the frame 470 is positioned over the next sheet 402 and the vacuum is actuated to cause the sheet 402 to be drawn toward and held in place by the vacuum ports 485.

The platen 500 in the illustrated embodiment is movable in a linear manner in a direction that is both toward and away from the first station 410. For example, the platen 500 can be movable along guide tracks or the like (not shown).

The system 400 includes a third station 520 that is downstream of the second station 490. The third station 520 includes a substrate (e.g., table) 530 that has a planar top surface 532 that has dimensions that can accommodate the sheet 402. Between the second station 490 and the third station 520, a pair of rollers 540 is provided. The rollers 540 can be nip rolls or pinch rolls that are powered rolls that are used as a puller for moving the sheet 402 from the second station 490 to the third station 520. In particular, the platen 500 carrying the sheet 402 is moved in a direction toward the third station 520 and the rollers 540 are positioned such that a leading side 405 of the sheet 402 is placed into contact with the rollers 540. When the leading side 405 contacts the rollers 540, the leading side 405 and the rest of the sheet 402 is fed between the two rollers 540 to cause linear movement of the sheet 402 from the platen 500 to the substrate 530 at the third station 520. The rollers 540 also serve as a mechanism for cleaning the sheet 402 from foreign debris (dust). For example, the relatively small lower roller shown may be a powered cylinder, and the relatively upper cylinder may carry a spool of mild adhesive to draw debris from the surface. In general, the system may also include additional cleaners, air filters, air impingement nozzles, anti-static materials, structures, or mechanisms, as are appropriate to maintain a predetermined level of cleanliness. It should also be noted that frame 470 may be devised to transport prints directly into the nip between rollers 540.

The system also includes a second secondary track 550 that is located along a portion of the main track 450. Like the first secondary track 460, the second secondary track 550 has a first end 552 and an opposing second end 554 with the first end 552 being located at the third station 520. A second carriage 560 can be the same or similar to the first carriage 440 and is operatively coupled to both the second secondary track 550 and the main track 450 and has a range of motion based on the length of the second secondary track 550 in that the ends 552, 554 of the secondary track 550 define the limits of the travel of the second carriage 560. The main track 450 and the second secondary track 550 can include rails on which the carriage 560 is driven. The second carriage 560 is coupled to the second secondary track 550 at a top portion thereof and is coupled to the main track 450 along its center and bottom portions. The second carriage 560 includes a frame 570 that supports the sheet pickup mechanism 580. The frame 570 includes a plurality of parallel support members 572 and a cross bar 574 that is coupled to the parallel support members 572. A coupling member 575 couples the frame 570 to a rail that is part of the main track 450.

The sheet pickup mechanism 580 can be in the form of a vacuum system that includes a plurality of vacuum ports 585 that are arranged and positioned along the frame 570 and more specifically, about the support members 572. In the illustrated embodiment, there are six (6) vacuum ports 585 that are located at each end of each support member 572. Each vacuum port 585 extends downwardly from the frame and includes a sheet engaging portion 586 (e.g., a cup shaped vacuum member) that contacts the sheet 402. The vacuum ports 585 are operatively connected to a vacuum source so that a vacuum can be provided in the vacuum ports 585 when a controller is actuated. The vacuum ports 585 are arranged so that each corner of the sheet 402 has a corresponding vacuum port 585 positioned thereover and additional vacuum ports 585 can be located centrally over the sides 404, 406 of the sheet 402 proximate the registration marks 420.

The sheet pickup mechanism 580 is part of a robotic system and therefore it can be moved in a controlled manner. For example, the frame 570 can be at least moved in an up and down manner to permit the vacuum ports 585 to move between a retracted position and an extended position where the vacuum ports 585 are brought into a proximate relationship with the underlying sheet 402. Any number of different types of actuators can be used to effectuate the movement of the frame 570 between multiple, different positions. When each vacuum port 585 is actuated, negative pressure is formed in each vacuum port 585 causing and due to the close proximity between the sheet 402 and the frame 570, the sheet 402 is drawn toward (lifted up from the underlying sheets 402) and held in place by the vacuum. Once the sheet 402 is held by the vacuum ports 585 of the frame 570, movement of the second carriage 550 along the second secondary track 460 and the main track 450 results in the sheet 402 being capable of being moved from one location (station) to another location (station).

More specifically, the sheet pickup mechanism 580 is intended to move the sheet 402 from the substrate at the third station 520 to another downstream processing location, such as a fourth station 600. The fourth station 600 has a substrate 610 with a top planar surface 620 which receives the sheet 402 from the third station 520. The first secondary track 460 does not extend to the third station 520 and similarly, the second secondary track 460 does not extend to second station 490.

The system also includes a third secondary track 750 that is located along a portion of the main track 450. Like the first and second secondary tracks, the third secondary track 750 has a first end 752 and an opposing second end 754 with the first end 752 being located at the fourth station 600. A third carriage 760 can be the same or similar to the first and second carriages and is operatively coupled to both the third secondary track 750 and the main track 450 and has a range of motion based on the length of the third secondary track 750 in that the ends 752, 754 of the secondary track 750 define the limits of the travel of the third carriage 760. The main track 450 and the second secondary track 750 can include rails on which the carriage 760 is driven. The second carriage 760 is coupled to the third secondary track 750 at a top portion thereof and is coupled to the main track 450 along its center and bottom portions. The third carriage 760 includes a frame 770 that supports the sheet pickup mechanism 780. The frame 770 includes a plurality of parallel support members 772 and a cross bar 774 that is coupled to the parallel support members 772. A coupling member 775 coupled the frame 770 to a rail that is part of the main track 450.

The sheet pickup mechanism 780 can be in the form of a vacuum system that includes a plurality of vacuum ports 785 that are arranged and positioned along the frame 770 and more specifically, about the support members 772. In the illustrated embodiment, there are six (6) vacuum ports 785 that are located at each end of each support member 772. Each vacuum port 785 extends downwardly from the frame and includes a sheet engaging portion (e.g., a cup shaped vacuum member) that contacts the sheet 402. The vacuum ports 785 are operatively connected to a vacuum source so that a vacuum can be provided in the vacuum ports 785 when a controller is actuated. The vacuum ports 785 are arranged so that each corner of the sheet 402 has a corresponding vacuum port 785 positioned thereover and additional vacuum ports 785 can be located centrally over the sides 404, 406 of the sheet 402 proximate the registration marks 420.

The sheet pickup mechanism 780 is part of a robotic system and therefore it can be moved in a controlled manner. For example, the frame 770 can be at least moved in an up and down manner to permit the vacuum ports 785 to move between a retracted position and an extended position where the vacuum ports 785 are brought into a proximate relationship with the underlying sheet 402. Any number of different types of actuators can be used to effectuate the movement of the frame 770 between multiple, different positions. When each vacuum port 785 is actuated, negative pressure is formed in each vacuum port 785 causing and due to the close proximity between the sheet 402 and the frame 770, the sheet 402 is drawn toward (lifted up from the underlying sheets 402) and held in place by the vacuum. Once the sheet 402 is held by the vacuum ports 785 of the frame 770, movement of the third carriage 750 along the third secondary track 760 and the main track 450 results in the sheet 402 being capable of being moved from one location (station) to another location (station) and allows other items, as described below, to be delivered to the fourth station 600.

More specifically, the sheet pickup mechanism 780 is intended to move items between the substrate 610 at the fourth station 600 and another downstream processing location, such as a fifth station 800. In accordance with the present invention, the fifth station 800 includes a plurality of lens sheets 900. Similar to the stack of interlaced print sheets 402, the lens sheets 900 are arranged in a stack with the lens portion of the sheet 900 facing upward.

Figure 8:
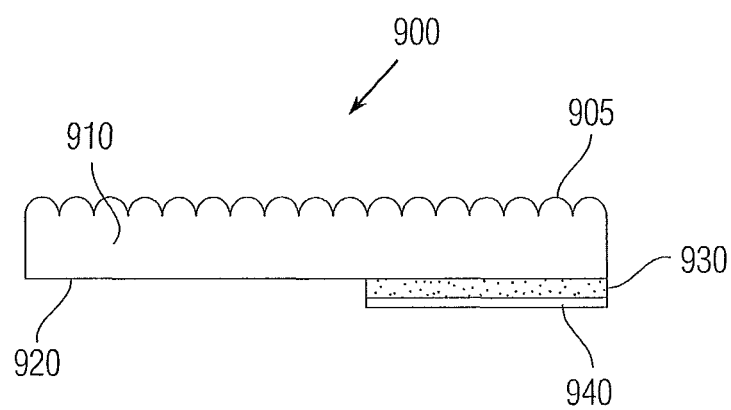
FIG. 8 is a cross-sectional view of a lens sheet with an adhesive region and release layer.

As shown in FIG. 8, the lens sheet 900 has a lens portion 910 along a top surface 905 of the sheet 900 and an opposite bottom surface 920. The bottom surface 920 is typically a planar surface. In accordance with one embodiment, the bottom surface 920 has an adhesive layer 930 formed in a select area thereof. More specifically, the adhesive layer 930 can be formed within a center region of the bottom surface 920 or it can be formed along one half of the bottom surface 920 or at some other location. The adhesive layer 930 can be formed of any number of different types of adhesives and in one embodiment, the adhesive layer 930 is a pressure sensitive adhesive (PSA). A PSA format that is particularly amenable to use with the present system includes adhesive that substantially extends across the lens sheet in one axis, but is expressly left short of the full sheet dimension so that two adhesive-free margins remain at opposite ends of each sheet. It should be noted that in this case, the term "substantially extends across" is meant to include those preparations both in which the PSA is made truly flush with the lens edge, and those in which the PSA is slightly set back. A setback may be specified in certain PSAs to anticipate elastic deformation of the adhesive during lamination, which might otherwise result in bleeding of the PSA and unintended marring or bonding of stacked assemblies. Commonly, the region of the print carrying interlaced imagery will effectively correspond with the PSA-coated region. A release liner 940 is provided and covers the exposed surface of the adhesive layer 930. The release liner 940 can be formed of any number of different suitable materials, including a paper or plastic material. As is known, the release liner 940 is removed to expose the adhesive layer 930 and permit bonding of the lens sheet 900 to another structure, such as the sheet 402 as described herein. The lens sheet 900 preferably is provided in a size that is the same size as the print image sheet 402 (e.g., photograph) or slightly greater. For example, the lens sheet may be dimensioned to extend slightly beyond the print so that gripping and positioning devices may have unhindered access to upper and lower surfaces of a lens sheet. Also, the print may be dimensioned and positioned so that a small border of the print medium ultimately protrudes beyond the perimeter of the adhered lens sheet. This protrusion may be used as a mechanical positional reference for subsequent operations, such as the cutting or separation of the images. These options are independent and may be combined within the same layout. It will therefore be appreciated that the location of the adhesive layer 930 and release layer 940 are elective and can be different than the illustrated location.

In accordance with the present invention, once the sheet 402 has been placed on the substrate 610 at the fourth station 600, a lens sheet 900 is then delivered to the fourth station 600 using the sheet pickup mechanism 780 in the manner described above. In particular, the vacuum ports 785 are actuated when the frame 770 is disposed over the lens sheet 900 resulting in the lens sheet 900 being securely held on the frame 770 and capable of movement to other locations, such as the fourth station 600. As with each of the sheet pickup mechanisms described herein, the sheet pickup mechanism 780 is configured so that it can move up and down as well as move linearly (side to side) between the various stations. While the stations are shown herein as being essentially linear in layout, it will be understood that the stations are not limited to being in a linear layout and instead can be laid out in other manners. It may also be appreciated that a cleaning system such as a set of suitably configured rollers including one adhesive pick-up roller may be interposed between the lens stack and fourth station 600 in order to remove dust from the PSA release liner or other suitable surface, in a manner analogous to that rollers 540 which were previously described as a means to clean the print surface.

Once the lens sheet 900 is delivered to the fourth station 600, the lens sheet 900 is then disposed over the sheet 402 in an overlying manner. The alignment between the lens sheet 900 and the underlying sheet 402 is initially performed by the sheet pickup mechanism 780 which delivers the lens sheet 900 to a location where the sheet 402 is present; however, as described below, the fourth station 600 includes a precision alignment mechanism to ensure that the lens sheet 900 is aligned with precision relative to the sheet 402.

The fourth station 600 also includes a pair of gripper units 1400 that are provided along two opposing sides 612, 614 of the substrate 610. The gripper units 1400 are operatively connected to a controller to permit each gripper unit 1400 to be individually controlled. The gripper units 1400 can be any number of conventional gripper units and can be of the type that has a pair of opposing gripper fingers that can be actuated to hold an item (e.g., the lens sheet 900) therebetween. The gripper units 1400 are opposite one another and therefore opposite sides of the lens sheet 900 that is to be grasped. The gripper units 1400 are controllable and movable so that the position of the sheet 900 relative to the underlying sheet 402 that is disposed on the substrate 610 can be adjusted by controllably moving one or more of the gripper units 1400. The gripper units 1400 can have multiple degrees of freedom. For example, the gripper unit 1400 can more in a forward direction toward the sheet 402 and a rear direction away from the sheet 402 and can move in a side-to-side direction along the length of one of the sides 404, 406. This permits the position of the lens sheet 900 to be changed relative to the sheet 402. For example, the independent control over the two gripper units 1400 permit one or both sides of the lens sheet 900 to be adjusted relative to the underlying sheet 402. Thus, the skew can be monitored and adjusted.

In one embodiment, the gripper unit 1400 is a stepper motor based device that permits control, with a high degree of precision, over the movement of the lens sheet 900 relative to the sheet 402. A stepper motor in use compatibly with the current invention has a 5 micron (0.0002") step size. The points of contact between the grippers and the gripped material may be outfitted in various ways. However, any laxness or ambiguity in the contact points may induce error or delay in the automated positioning. It has been found that a gripper that captures the lens sheet between two rigid pins, such as conically pointed metal set screws, provides an effective and reliable means of contact. Given a gripper at each opposite end of a lens sheet, this method provides two secure contact points in the same plane. The coordinates of these contact points can then be interactively reestablished by actuation, to whatever degree required to obtain the desired alignment.

It will also be appreciated that the substrate 610 at the station 600 can include some means for securely holding the sheet 402 in place as adjustments are made to the lens sheet 900 that overlies the sheet 402.

The fourth station 600 includes other components for processing the sheet 402 that is located on the substrate 610. More specifically, the system of the present invention additionally has an alignment/registration system 1000 for assuring that the assembled lens sheet 900 and the sheet 402 are properly aligned; an adhesive application device 1100; and a curing system 1200. More specifically, the alignment/registration system 1000 is designed to align the lenticular lens sheet 900 to a matching printed photograph (sheet 402). It should be generally noted that the exact location of components in compact automation systems depends upon such factors as component dimensions, paths of travel, and access for maintenance. These properties may vary between different implementations, between manufacturers, or within a single vendor's line of components. For example, in envisioned variations of the present system, application of liquid adhesive through adhesive application device 1100 is not limited to the illustrated location, but can occur at any stage after prints emerge from the cleaning roller. For example, a stationary applicator located near the exit side of rollers 540 may apply a continuous bead without the need to move the application device, given coordinated print motion and adhesive metering.

The alignment of the print sheet and lens sheet can also include mechanical alignment features which provide gross alignment of the sheet materials. An example of such a mechanical feature is a set of retractable pins. The pins may be tapered so that as a sheet of material is released onto the alignment table, the sheet is guided into approximate position and temporarily retained by the set of pins.

In the practice of the invention, four pins for each sheet of material have been found effective. Alternately, eight pins may be employed, as when two pins located at each corner. Alignment pins can be retractable so that subsequent alignments and adjustments can be made in an unobstructed fashion. Sets of retractable pins may be separately controlled so that each sheet material encounters only its dedicated set of guides. Each set of pins may be controlled so that the retraction of the set is synchronous. Alignment pins can also be mounted on adjustable bases, so that a degree of dimensional inconsistency between batches of sheet goods may be accommodated.

The alignment/registration system 1000 includes an optic device 1010 that is used in the alignment process and more particularly, the optic device 1010 can be in the form of first and second spaced cameras 1020, 1030. The first camera 1020 is on one side of the main track 450 and the second camera 1030 is on the other side of the main track 450 spaced from the first camera 1020. The first and second cameras 1020, 1030 are located above the substrate 610 at the fourth station 600 and are designed to focus on select areas (locations) of the substrate 610. As described below, the first and second cameras 1020, 1030 are designed to focus on the registration marks 420. In accordance with one embodiment of the present invention, each of the first and second cameras 1020, 1030 are in the form of a camera that includes a telecentric lens. A telecentric lens is a compound lens which has its entrance or exit pupil at infinity. This means that the chief rays (oblique rays which pass through the center of the aperture stop) are parallel to the optical axis in front of or behind the system, respectively. A telecentric lens has no angular parallax which makes it a reliable way to look through the lenticular lens sheet 900. In addition, a telecentric lens can be used since it is designed to focus on the small (e.g., half-inch sized) registration mark 420 and therefore is quite suitable for the intended application.

Figure 9:
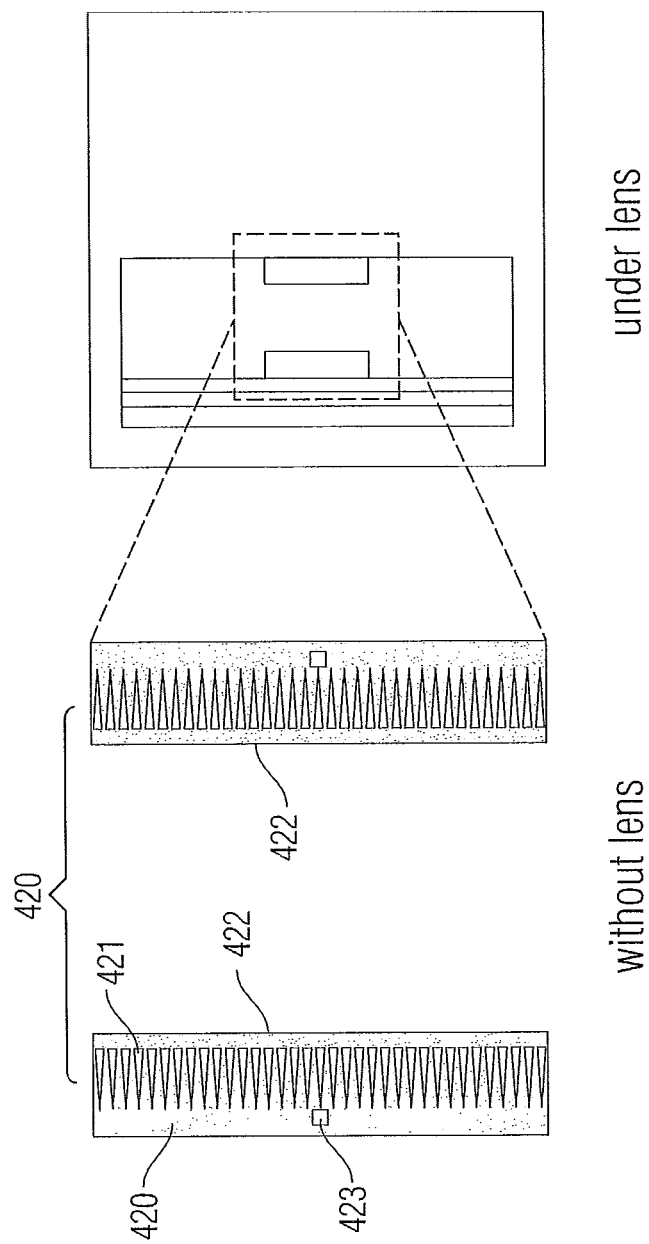
FIG. 9 is an enlarged view of registration marks that are formed on the print sheet of FIGS. 7A and B.

The registration mark 420 is shown in magnified form in FIG. 9 and it will be appreciated that the registration mark 420 includes two outward-pointing indicator rows 422, each row including plurality of side-by-side arrowheads 421 that all point in the same direction. Each of the two oppositely-pointing indicator rows 422 includes as well as a small square 423 that is centrally located along its associated plurality of arrowheads 421 and each square is located adjacent a point of one of the arrowheads 421. In particular, the registration mark 420 can be in the form of a half-inch square precision arrowhead pattern that is printed on the sheet 402 as described previously. As shown in FIG. 9, the tips of one set of arrowheads 421 point toward the side edge of the sheet 402, while the tips of the other point toward the image area. As shown in FIG. 9, under the telecentric lens, the arrowhead shapes are spread out by the lens optics.

Figure 10:
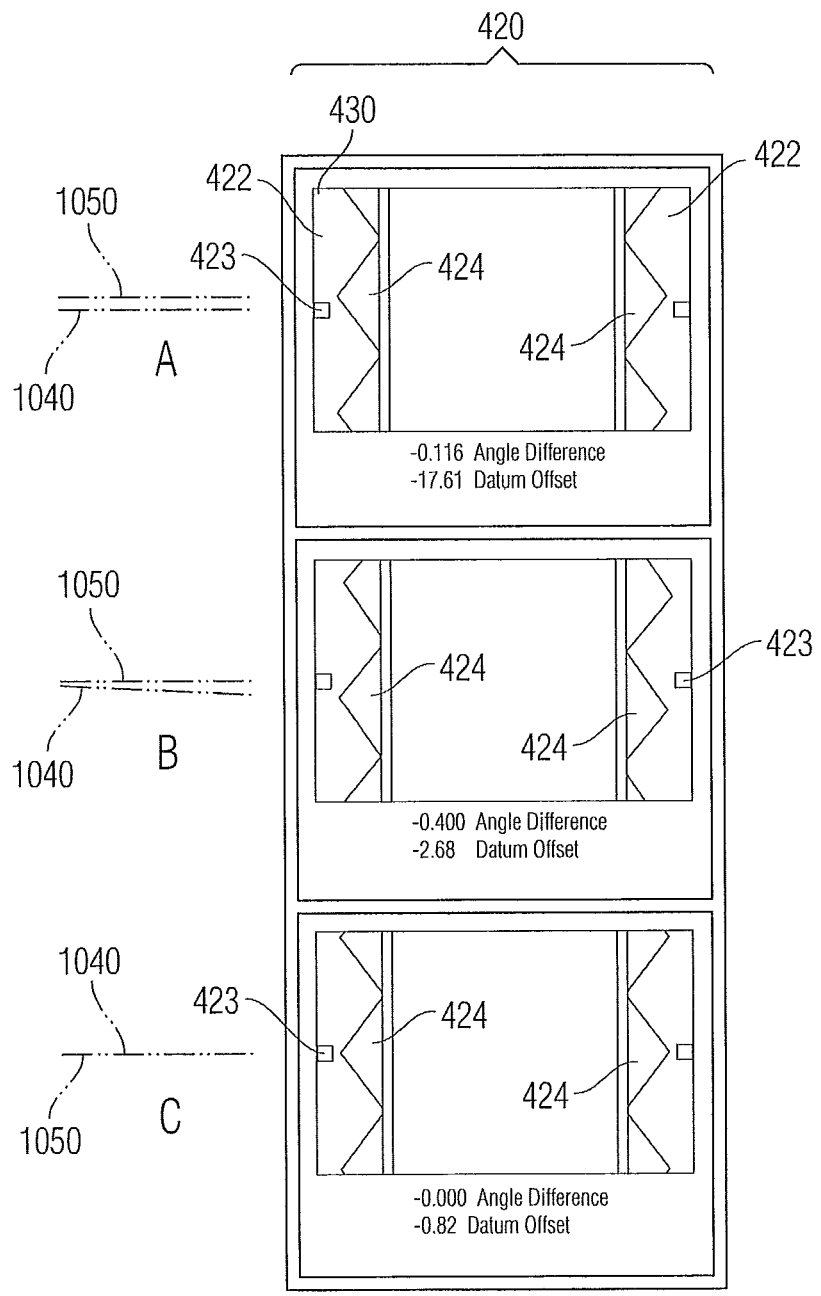
FIGS. 10A-10C show various alignments between the lens sheet and print sheet and the observable differences in the registration marks of each of the different alignments.

FIG. 10 shows how the registration marks 420 are viewed through the telecentric lenses of the first and second cameras 1020, 1030. In particular, the registration mark 420 shown in the camera corresponds to one registration mark 420 that is formed along side 404 of the sheet 402. The imposition of the periodic lens array over registration mark 420 over the periodic indicator row 422 shown in FIG. 9 yields optically amplified indicator 424. As shown, the telecentric lenses of the cameras 1020, 1030 focus on the square 423 and adjacent arrowheads 421 located within each registration mark 420. Under the optical influence of the lenticular lens array, each indicator row 422 of static arrowheads 420 is optically sampled in a fractional manner and is displayed as a dynamic alignment icon in the form of optically amplified indicator 424. Specifically, in this embodiment, optically amplified indicator 424 dynamically emulates any relative motion between the registration mark and the lenticular lens sheet, as shearing and dislocation of the triangular indicator is readily apparent. The opposite-facing dynamic device verifies and geometrically reinforces the deviation evidenced by a single dynamic indicator.

The detailed structure of the registration mark has been found to be essential to the efficient, flexible, and reliable operation of the invention. As noted earlier, at the end of the assembly operation, lenses must ideally be parallel to the printed image raster, and each interlaced image field must also be exactly aligned with an associated lens. The simple and compact alignment and registration indicator described above exploits a conscientiously imposed difference in spatial frequency between a repeated image icon and the lenticular array.

The indicator can be made so that is serves as an intuitive guide to any positional errors. A single registration mark 420 can be used to align less sensitive cases such as a small image, or an image using relatively coarse lenses. When two registration marks 420 are used at opposite ends a printed sheet, very slight deviations from optimal alignment can be detected. The use of two oppositely located registration marks 420 therefore enables the alignment of relatively large sheets of relatively fine pitch. Furthermore, registration mark 420 can be read by machine, by a human operator, or, intermediately, by a machine vision system supervised by a human operator.

When two registration marks are used, the marks are usually most effectively deployed in an aligned manner, centered at opposite ends of an interlaced, printed image. The observational cross-referencing of two spatially separated marks can reveal any deviation over the entire length of the lens sheet. For example, one registration mark 420 generating two opposite-facing optically amplified indicators 424 may be observed through a camera and used to make a primary alignment. Once the primary alignment is achieved, any fractional or residual deviation occurring at the opposite end of the combined sheet materials will be observable in the optically expanded second mark. By this means, relatively large images may be precisely aligned with a high degree of reliability using a relatively small dedicated surface area.

This property is particularly relevant when telecentric lenses are employed. For example, a conventional practice in lenticular registration is to observe the distortion of pitch band patterns extended across a large area of the print. However, the geometry of a telecentric lens requires that the lens diameter be no smaller than its observed area. While theoretically possible, a telecentric lens in any practical adaptation with this prior practice would be cost-prohibitive.

In contrast, the registration system of the present invention allows 300×300 mm (11.8×11.8") images using lenses in the 300 to 400 micron range to be aligned using two observed areas only 12.5 mm square (0.5×0.5"). The use of the disclosed registration marks therefore reduces the implicit diameter of a requisite telecentric lens by roughly a factor of twenty. Usefully, and unlike conventional lens optics, a telecentric lens provide a precise geometrical map of its subject.

As noted above, each exemplary registration mark 420 includes two indicator rows 422 of elongate arrowheads spaced apart within a relatively small area at the margin of an interlaced print. The rows of arrowheads within a given mark are arranged so that their arrows point away from one another. Twenty to forty side-by-side arrowheads 421 are sufficient to provide the desired effect and occupy indicator row 422. However, in pursuit of the intuitive aspect of the registration feature, an odd number of arrowheads may be elected, as this allows the aligned condition to be indicated by centration of the point of an optically expanded triangle.

The apparent visual mobility of optically amplified indicator 424 depends upon an expressly established periodic relationship. More specifically, each row of arrowheads within the mark employs a deliberate and conscientious pitch disparity between elongate printed arrowheads and the lenses in a preselected lens array. The mark also includes indicia typified by square 423 that identify a targeted alignment position, generally located in alignment with a central arrowhead. In a tested embodiment, printed arrowheads are devised be isosceles triangles having a base-to-height ratio of approximately 1:5. A frequency disparity value of about 9% has been found especially effective over a range of commercially available lens pitches, whether used in conjunction with human or machine vision.

When this proportionality is provided, a suitable lenticular lens array located upon the elongate printed will yield refractively expanded triangles having a vertex angle of approximately 90°, implying a base-to-height ratio of approximately 1:0.7. Therefore, in this exemplary case, the arrowheads are subject to a roughly sevenfold transverse optical expansion. It should be noted that this transverse optical expansion is not a direct function of the numerical magnification, which may in practice be effectively infinite, but rather from the interplay of the two periodic features, namely, the lenticular lens array and the rows of narrow printed arrowheads. Given this circumstance, it may be appreciated that the observed optically amplified indicator 424 is not the simple magnification of one arrow, but a composite optical result arising from compound optics.

Since this degree of expansion is primarily the result of a frequency effect, and does not strictly rely upon the numerical optical magnification of the lenticular lenses, the optical effectiveness of the arrangement has been found to be relatively robust, even in cases where an air gap or temporary protective film intrudes between the back of the lens sheet and the printed material. While a range of frequency disparity of 5% to 15% is potentially effective in this application, it has been found that relatively lower frequency disparity values results in a lower-contrast optical result, while relatively higher disparity values diminish the spatial amplification effect which serves to reveal any misalignment.

A functional property of this spatial relationship is that the lens array not only expands the arrowhead pattern, but amplifies any skew or transverse displacement contemporaneously occurring between the lenses and the central indicia. Furthermore, as long as the arrowhead pitch is chosen to be the lesser of the two frequency values, the optical behavior of the mark is intuitive. Namely, if the lens sheet is skewed in a counterclockwise orientation, the arrowheads appear skewed or sheared in the same direction. The actual skew angle, though, is optically exaggerated in the observed mark. As a result, relatively subtle skewing is made readily apparent.

Similarly, any shift from the central axis identified by the indicia is revealed by a departure of the expanded triangles from an aligned location; this displacement is also amplified by the optical relationship of the registration mark and lens material. These properties of the alignment system therefore facilitate relatively swift and certain alignment, be it manual or automated.

A fully automated alignment system would of course be indifferent to design factors relating to human cognitive expectation. A machine vision and registration application could readily be programmed to react to visual input that might be confusing or counterintuitive to a human observer. The utility of the present registration system therefore should not be taken to be limited to any linkage of actual movement or displacement and apparent movement or displacement.

An advantage of machine vision systems is that they can enhance captured imagery and quantify targeted values. Accordingly, another registration feature of the present invention is the presence of a target location axis, generally shown at 1040, and a lens axis, generally shown at 1050, that are visible as part of the machine's vision system. These two axes 1040, 1050 are similar to a cross hair that shifts as the lens sheet 900 moves relative to the sheet 402. Optimal, desired positioning between the lens sheet 900 and the sheet 402 result when the axes 1040, 1050 overlap one another.

FIG. 10A shows the situation where the lens sheet 900 is off-centered relative to the sheet 402. In this off-centered arrangement, each magnified square 423 of each registration mark 420 is not aligned with the center or tip of the adjacent optically amplified indicator 424. In other words, the tip of the optically amplified indicator 424 is not pointing at the square 423. In addition, the off-centered nature of the lens sheet 900 relative to the sheet 402 is seen by the parallel spacing between the two axes 1040, 1050. FIG. 10B shows the situation where the lens sheet 900 is skewed relative to the sheet 402. Both squares 423 are not aligned with the tips of their associated optically amplified indicators 424.

In addition, the axes 1040, 1050 are spaced apart, but unlike in FIG. 10A, the axes 1040, 1050 are also not parallel to one another and in particular, the right side of the axis 1050 is spaced greater from the axis 1040. FIG. 10C shows the situation where the lens sheet 900 is properly aligned relative to the sheet 402. When properly aligned not only are the squares 423 of both registration marks 420 aligned with the tips of the optically amplified indicators 424, but also the axes 1040, 1050 are aligned, as evidenced here by the axes 1040, 1050 overlapping one another.

As described above, the sheet 900 is controllably moved in very small increments (e.g., using stepper motors, etc.) to position the lens sheet 900 in proper alignment with the sheet 402 which is validated by the information receives from the telecentric cameras. As shown in the figures, the information from the telecentric cameras is conveniently displayed on a display to allow the operator to see in real-time the adjustment and the proper alignment between the lens sheet 900 and the sheet 402. The changing the appearance of the registration mark 420 is used to correct both skew and centering of the lens sheet 900 relative to the sheet 402. In addition to the observations discussed above, banding in the interlaced image or images, or in features located in the page border, may cooperatively assist in the judgment of lens/image misalignments.

In accordance with the present invention, the alignment system of the present invention is a machine vision based system in which the operation of the stepper motors (e.g., in the grippers) result in the lens sheet 900 being properly aligned with the sheet 402 in about 2-3 seconds due to the precision and speed of the stepper motors. For example, the precise adjustment and alignment of the two sheets can be done very quickly and precisely due to the incremental adjustments of the stepper motors (e.g., 4200 motor steps).

As previously mentioned, the alignment/registration system 1000 includes an adhesive application device 1100 for applying an adhesive to the sheet 402 to at least temporarily and selectively bond the overlying lens sheet 900 to the sheet 402. The device 1100 is designed to controllably deliver an amount of adhesive within a controlled area and in particular, the device 1100 is positioned and designed to lay done adhesive along the adhesive locator mark 430 that is part of the sheet 402. The adhesive locator mark 430 is in the form of a line that extends along the side of the sheet 402 and therefore, the device 1100 is configured to lay down an adhesive in a linear manner such that the adhesive overlies the locator mark 430. The applied adhesive can be thought of as a bead of adhesive material. The adhesive can be a number of different types of adhesive; however, in one embodiment, the adhesive is in the form of a UV curable adhesive. It will also be understood that the adhesive is applied to the locator mark 430 prior to deliver and placement of the lens sheet 900 over the sheet 402 since the adhesive selectively bonds the two sheets 900, 402 together.

Lenticular images must maintain a specific focal distance between the lens surfaces and their common focal plane, otherwise, a visible degradation of the image occurs. Adhesives must have a certain average thickness in order to be effective; however, this thickness can vary substantial across the interface, causing errors of focus and alignment in the observed lenticular image. To mitigate this variation, spacers, such as bars or spherules of polymer or glass can be added to a fluid adhesive mixture. If the spacer material is transparent to visible radiation and the material substantially matches the refractive index of the cured adhesive, the spacers will be invisible. The spacers preserve a known separation between the two bonded materials so that the fluid adhesive maintains a relatively constant thickness. The adhesive layer carrying the spacers can alternately or collaboratively be prefabricated as a PSA used subsequently to form a bond. It has been found that a useful proportion, when 25μ to 100μ spherules are used, is between 1000 to 5000 parts adhesive to 1 part spherules by weight.

It may readily be appreciated that the previously recited alignment and adhesion strategies are readily transferable to the mounting of refractive lens arrays upon flat panel electronics displays. Alignment marks formed in accordance with the invention may be formed in the black matrix disposed upon a glass panel, so that the alignment devices share a focal plane with the pixel or subpixel aperture mask. In the case of a lenticular autostereoscopic display, the registration marks would typically be centered at the top or bottom of the panel. The marks in the matrix may be overprinted in white pigment to provide a target, or may merely be disposed upon a light background. To avoid moiré effects, flat panel lenticular displays are often devised so that the pixel raster and the lens raster are skewed at a relative angle of about 10°. In this case, the mark may itself be modified by skewing or shearing, or, alternately or cooperatively, the computer vision software may be adapted to the optical situation.

Returning nw to the drawings, the curing system 1200 of the system 1000 includes a movable frame 1210. The movable frame 1210 includes a transverse support member 1212 and a plurality of support members 1214 that extend outwardly from the support member 1212 and are arranged parallel to one another.

The curing system 1200 includes a plurality of devices 1220 that are operable to cure the adhesive and in particular, the devices 1220 are in the form of a plurality of LEDs that are arranged along the transverse support member 1212. While an adhesive bond is detailed above, in practice the printed image and the lenticular lens sheet may imaginably be mechanically, frictionally, or adhesively fixed in the aligned position.

The system 1200 also includes a sheet pickup mechanism 1300 that is designed to adhere to and remove the partially bonded sheets 900, 402. The mechanism 1300 can be in the form of a vacuum system that includes a plurality of vacuum ports 1385 that are arranged and positioned along the frame 1210 and more specifically, about the support members 1214 or other members of the frame. In the illustrated embodiment, there are at least four (4) vacuum ports 1385 that are located in each corner of the frame 1210.

Each vacuum port 1385 extends downwardly from the frame and includes a sheet engaging portion (e.g., a cup shaped vacuum member) that contacts the sheet 402. The vacuum ports 1385 are operatively connected to a vacuum source so that a vacuum can be provided in the vacuum ports 1385 when a controller is actuated. The vacuum ports 1385 are arranged so that each corner of the partially bonded sheets 900, 402 has a corresponding vacuum port 1385 positioned thereover to allow the corners of the bonded sheets 900, 402 to be lifted and moved to another location.

The sheet pickup mechanism 1300 is part of a robotic system and therefore it can be moved in a controlled manner. FIG. 6 shows a track 1500 on which the sheet pickup mechanism 1300 is movable and can be moved in multiple directions as disclosed herein. For example, the frame 1210 can be at least moved in an up and down manner to permit the vacuum ports 1385 to move between a retracted position and an extended position where the vacuum ports 1385 are brought into a proximate relationship with the partially bonded sheets 900, 402. Any number of different types of actuators can be used to effectuate the movement of the frame 1210 between multiple, different positions. When each vacuum port 1385 is actuated, negative pressure is formed in each vacuum port 1385 causing the partially bonded sheets 900, 402 to be drawn toward the frame and held in place by the vacuum. Once the partially bonded sheets 900, 402 are held by the vacuum ports 1385 of the frame 1210, the bonded sheets can then be moved from one location (station) to another location (station) by movement of the frame along a rail or some other type of device that provides controlled movement of the frame and vacuum ports 1385 from one location to another location.

In one embodiment, as shown, the curing system 1200 can be a multi-function system in that the system 1200 is not only operable to cure the adhesive laid down over locator 430 (adhesive bead) but it also can apply the adhesive (and thus serves as the applicator 1100) and also remove the bonded, assembled sheet (900, 402) from the fourth station and deliver it to another location. This delivery operation may include release to a table, cart, belt, or any other transporting device or system. It may electively include human labor, or may be fully automated.

For example, the partially bonded sheets 900, 402 are moved to one or more other downstream locations (not shown) where they undergo further processing and in particular, the further processing can include removal of the release layer 940 and lamination of the sheets 900, 402 to form the lenticular product. In order to process and perform lamination, the partially bonded sheets 900, 402, are typically flipped over prior to being subjected to the lamination process since, during the lamination process, the lens sheet 900 is the bottommost sheet to allow the print sheet 402 to be placed against the parts of the laminating device. More specifically, in one embodiment, the partially bonded sheets 900, 402 are flipped over and the release layer 940 is removed (manually or using an automated process (e.g., a robotic device)).

A film adhesive can be specially prepared to ease, accelerate, or automate lamination of lenticular images. In one embodiment, the film adhesive is manufactured so that at least one edge of one release liner extends beyond one edge of the adhesive layer. This free material extending beyond the edge of the adhesive layer can then be manually, pneumatically, hydraulically or mechanically gripped without unwanted contact between the gripping means and the adhesive layer. The adhesive layer can thereby be exposed without contamination or fouling of either the adhesive surface or the gripping means.

In a prior practice of manual lamination of lenticular images, a thin strip of the release liner is scored and removed to expose a band of adhesive. The image is manually adjusted before pressure is imparted along one edge to secure the alignment. The edge-joined sheets are momentarily held apart, and the inside edge of the protective PSA liner peeled back. The release liner is then doubled over so at the PSA surface is progressively exposed. This procedure is often followed as the lens and image are joined in a nip, so that there is no risk of components meeting prematurely.

In the practice of the invention, it has been found that this conventional procedure is not always optimal in the case where it is useful for the entire PSA surface to be exposed at once. Furthermore, if the release liner is removed when the secured edge is not held fixedly in a nip, the precision of the registration may be compromised. In certain cases, it has been found that a more reliable result may be attained by initiating the peel of the release liner from a corner which substantially neighbors the secured edge. The release liner can then be rolled off the adhesive surface diagonally. An angle of 45° relative to the typically rectangular components is a suitable value, although the positive effect is notable over a wide angular range.

This method, whether effected by an automation system or by a human operator, may be assisted by the provision of a tab or equivalent feature. A tab may be an extension of the PSA from which all layers but the release liner have been removed. An equivalent function may be provided an indentation rather than extension. In either case, the feature may be formed by selective and partial die-cutting, e.g. "kiss-cutting", but may be formed by various manual or automated methods. Alternately, the tab may be a discrete feature applied to the intact release liner.

Additionally, separation or peeling of the release liner in this general manner may be assisted by a vacuum pick-up, an air knife, an adhesive pad, or a mechanical gripper. The components may be diversely retained to resist the peeling force and to prevent premature contact, for example, by mechanical or vacuum means.

Irrespective of the particular liner preparation method, the assembled sheets 900, 402 are at some point delivered to a laminating device, which can be in the form of a pair of nip rollers. Sheets 900, 402 are introduced between the pair of nip rollers with print sheet 402 facing up and the resultant product is a laminated lenticular product. Since, as mentioned above, the print sheet 402 can include a number of separate interlaced prints (e.g., 6 per sheet), the laminated lenticular product (formed of laminated sheets 900, 402) may then be introduced to a cutting device, such as a die cutter, to individually cut the lenticular prints from the main laminated lenticular product.

It will be appreciated that the carriages of the present invention can be a robotic device that is controlled using a controller, such as a personal computer, etc., that moves the carriages a precise distance along the main track 450 and the respective other tracks it is coupled to.

Lenticular images are often produced in layouts containing multiple images. These individual images are then parted from one another by a separating means such as a knife, break, shear, guillotine cutter, slitter, die cutter, laser or waterjet. However, when lenticular images are assembled by laminating a prefabricated interlaced image to prefabricated lenticular lens sheet, residual lenticular material can not allow any reliable mechanical registration with any such separating means.

As previously described, the present invention expressly allows for a marginal extension of the layer upon which the image in printed. If the limit of the marginal extension is used as a reference in both the imaging phase and the separation phase, the images will occupy a known location, relative to the limiting edges or corners, at the time the images are parted. The need for repetitious manual alignment of the separation means, e,g., a cutting die, with the locations of the printed imagery can thereby by effectively eliminated. Cutting dies can include spring-loaded locator pins at appropriate locations.

Figure 11:
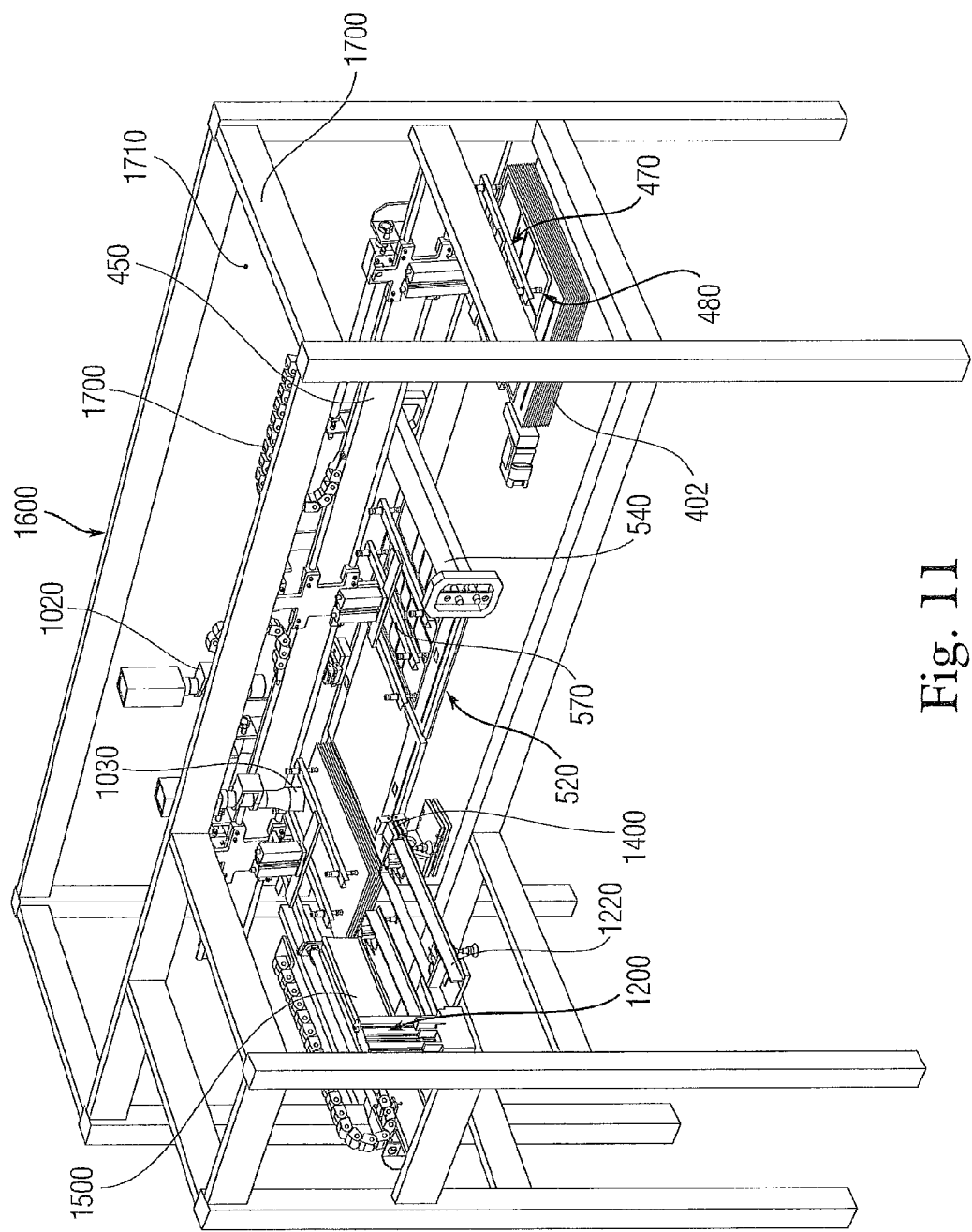
FIG. 11 is a side perspective view of an automated system for the assembly, alignment and adhesion of a lenticular product according to a second embodiment.
Figure 12:
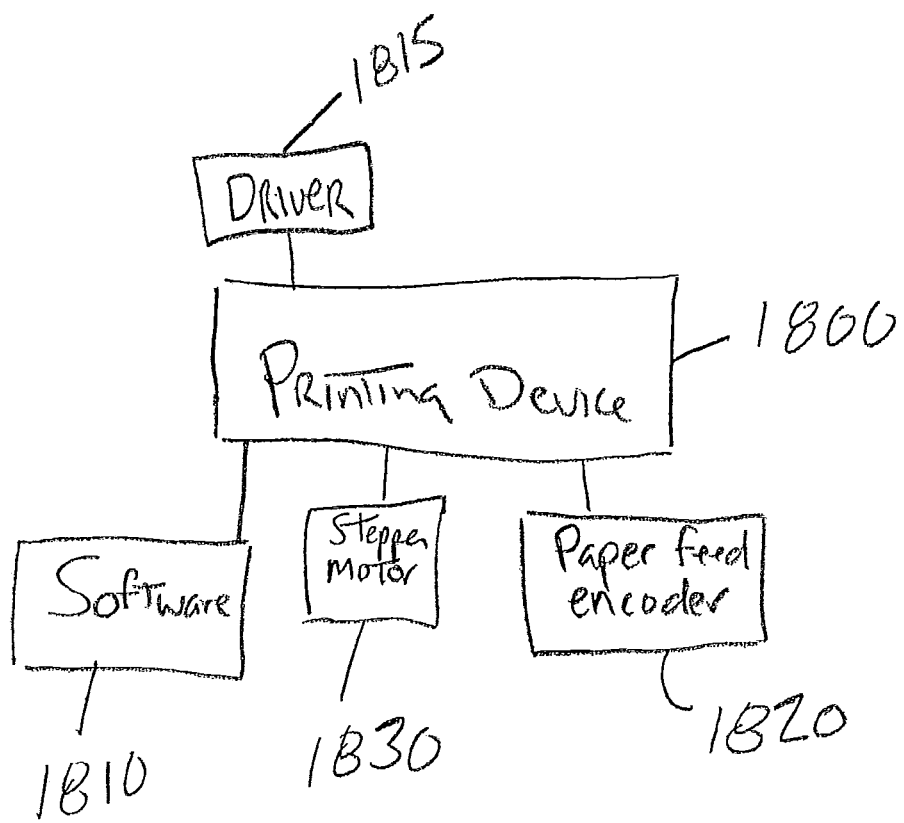
FIG. 12 illustrates the basic components of a printing device or system that is part of the automated lenticular photographic system according to one embodiment of the present invention.

FIG. 11 is a view of an automated system 1600 for the assembly, alignment and adhesion of a lenticular image (lenticular product). The system 1600 is similar to the system 400 and is formed of a number of individual components and/or stations and therefore, similar stations and components are numbered alike. The main difference between the system 1600 and the system 400 is that the second station 490 is eliminated and instead, the first secondary track 460 travels to the nip rollers 540. Accordingly, the frame 470 can be delivered at least to a location proximate the nip rollers 540. The first carriage 440 and frame 470 thus ride along the secondary track 460 to a location adjacent the nip rollers 540 to thereby feed the leading edge 405 of the sheet 402 into the space between the nip rollers 540. Once fed into the nip rollers 540, the rolling action of the rollers 540 causes advancement of the printed sheet 402 as well as cleaning of the sheet.

It will also be appreciated that FIG. 11 shows the system 1600 coupled to framework 1700. In FIGS. 5 and 6, the framework has been eliminated only for ease of illustration and simplicity; however, the system 400 would also be coupled to some type of framework, such as framework 1700. A wire management system 1700 can be used to manage cables, conduits, wires (such as vacuum tubes, etc.).

Framework 1700 can furthermore support panels 1710 which may act as shields, or when installed pervasively, as an enclosure. An enclosure may be transparent to visible radiation to allow visual monitoring of the system's operation. It may also selectively filter wavelengths of light, such as ultraviolet or infrared. Such filtering may be preferable in order to avoid inconsistent curing of adhesives or irregular operation of machine vision illumination systems. An enclosure may also include doors, valves, busses, access ports, seals, fans, filters, environmental controls, and any other features that may be elected to facilitate monitoring or maintenance of the system. For example, the enclosure may house one or more cameras or other sensors for local or remote monitoring of the equipment.

As previously mentioned, the processing station 300 includes image processing and printing equipment that is configured so that the image(s) and data file(s) received from the user interface 200 is further processed to create an interlaced print image file, based on the customer's order. The order, which may comprise diverse numbers of copies, sizes, and treatments, must be reliably tracked. Furthermore, if items are uniquely marked, duplicates may be readily recalled or recreated from archival data.

Barcodes can be used to identify and track lenticular images and their associated customer data. However, barcodes are usually disabled by the superposition of a lenticular sheet on a printed sheet. Therefore, conventional uses of barcoding are often inapplicable to the art of lenticular printing.

Figure 13:
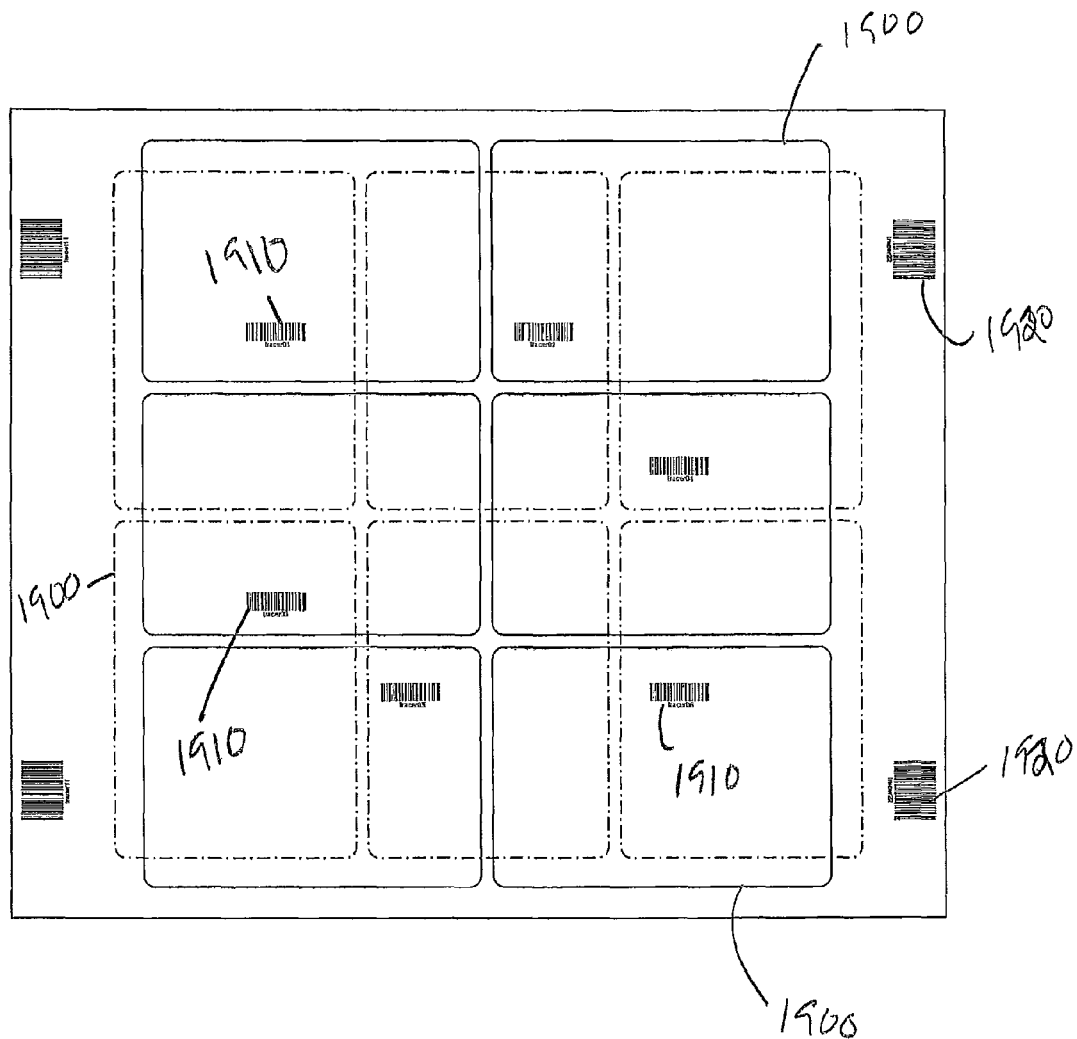
FIG. 13 is a top plan view of a lenticular product with lenticular images laid out in different orientations.

Now referring to FIG. 13, it has been demonstrated that systems formed according to the present invention can employ multi-image layouts with high material efficiency. Not all conventional in-line barcode printers have been found to be readily amenable to the diversity of layouts available in the overall system of the present invention. Also, the necessity of considering the orientation of the lens, which varies with the desired optical effect, as well as the orientation of the image, can preclude the simple image ID systems used in conventional photo labs. In one aspect of the present invention, image marking strategies and identification are provided and are especially adapted to the requirements of lenticular printing and handling as shown in FIG. 13.

The production of lenticular images differs in parameters from conventional image production, and entails many particularities not otherwise encountered. For example, the lenticular lens material is typically made of extruded polymer. Defects can occur during manufacture and marring can result from conversion and handling. Graphic media and adhesives are also subject to occasional defects or damage.

Occasionally these flaws will escape initial detection, necessitating the remaking of a completed image. In such a case, the ability to identify a specific image is crucial to the timely fulfillment of the order. Failure to fulfill an order with a predetermined time frame can result in financial penalties and loss of professional credibility to the image producer.

More generally, it is useful to be able to identify the number of items in a customer's order, and direct those items to the same station for packaging, addressing, sorting, combining with additional insertions, and mailing.

In accordance with the present invention, particular attention has therefore been paid to the ability to track each image 1900. A system previously described herein permits plural images 1900 to be efficiently formatted upon the same document in either portrait or landscape orientation. It is desirable that each image 1900 carry one barcode 1910. However, in such a flexible system, multiple printing paths may be required to accommodate the diversity of formats.

In the operation of the printing system of the present invention, it has been found that the conventionally reverse (back side) side of the media can be preprinted with identifying indicia, including barcodes 1910 and alphanumeric text. Collaboratively, at least one identifying indicia, such as a unique barcode 1910 or other recognizable mark, is included on the obverse (front) face of the material. In the present application of the invention, this operation has been usefully integrated into printing of the digital file that includes the interlaced imagery. This permits the interlaced imagery and the barcodes 1910 to be printed more efficiently.

During or subsequent to the printing of the imagery 1900, the obverse (front) mark and the reverse (back) mark are both scanned using a suitable scanner, including a bar code scanner or other type of device that is configured to read the mark. The obverse datum and the reverse datum are then correlated. If the placement of the plural images upon the page is standardized and orderly, and the preprinted reverse has be laid out so that the reverse of each separate image has been provided with its own unique datum, then each image can readily and reliably assigned a unique ID. As shown in FIG. 13, the reverse barcodes 1910 are specifically located such that each image 1900, whether it be a portrait or landscape orientation, has associated therewith a single barcode 1910. In other words, none of the barcodes 1910 are located in positions that overlap two images 1900 whether they are in the portrait orientation or the landscape orientation.

In this manner, the only in-line identification process required is the provision of at least one readable indicia, such as a barcode 1920, on the obverse (front). Obverse barcodes 1920 can readily be integrated into the imposition process, in which all graphic features, including images and registration or other marks, are formatted into a single digital file.

The printed sheet can carry a single image or plural images. In either case, the reverse can be preprinted with as many appropriately located indicia (barcode 1910) as necessary. The master indicia on the reverse can be a discrete feature, or that function can be served by one of the individual image identities. Electively, a sheet can carry duplicate identifying marks at differing locations, for redundancy or for freedom in handling or positioning.

In one embodiment, images having opposing aspect-ratios can be accommodated such that each image is left with a single and complete identifying indicia. In this application of the invention, it is therefore not necessary to provide two distinct sets of preprinted sheets in order to accommodate full layouts of portrait and landscape images.

Exemplary FIG. 13 shows a 6-up layout that leaves one barcode 1910 on each image, irrespective of the elected orientation.

The preprinting process can also encompass additional graphics such as a company logo, business address, viewing instructions, patent and copyright information, or any other elected device or decoration. Barcodes need not be black on a white background. Indeed, it may be preferable to print barcodes at the smallest practical size and lowest readable contrast. Limiting the size and density of the barcode minimizes the risk the backprinting being visibly transmitted through the front of the sheet. It has been found that, if printed with adequate resolution, barcodes having black densities as low as 25% can be reliably read with a standard handheld scanner.

The printed barcode 1920 identifies the set of images printed and the respective image locations on the sheet, so that individual images can be marked on the reverse with identifying data 1910. Images can then be separated, while retaining individual image data. The individual data can be used to sort, package, and mail the images, and can also serve as a reference for reorders.

In the preceding scenario, it is not necessary to read a barcode through the lens material, as the obverse/reverse data correlation may readily be made prior to the application of the lens material. However, in other scenarios, it is foreseeable that there would be an advantage in having the ability to recover printed data from the obverse of the sheet after the lens sheet was applied.

To that end, the present invention also includes a method by which barcodes can be made readable after having been covered with the lenticular lens array sheet. The bars in standard barcodes vary in width. The narrowest bar is known as the unit. Wider bars are integer multiples of this width, typically two, three, or four times the unit bar width. Each alphanumeric character is represented by a sequence of bars having specific widths.

The problem historically encountered with lenticular material is that when the cylindrical lenses parallel or skew across the bars in a barcode, they alter the bars' observed proportions. The encoded data is therefore unrecoverable, or gives erroneous results.

It has been found that equating the unit bar width with the lens pitch and filling the image fields correspondingly with black or white provides a barcode that may be consistently read through the lens sheet. Ideally, in such a case, the barcode pattern is aligned such that a unit bar corresponds to each elongate lenticular lens. Typically, the printed unit bars would be nearly centered on the cylindrical lens normals.

Given the above conditions, a scanner located directly over the barcode is presented with an optical image that accurately reiterates the original barcode. Lenticular sheet varies in optical design, but typically includes a viewing angle between 40° and 80°. The barcode is uncorrupted within this central included viewing angle.

For example, each lens in a nominal 75 lpi (lens-per-inch) lenticular lens sheet is approximately 338 microns (0.013") wide. In the Code128B barcode symbology, the capital letter "A" is represented by the alternating black/white sequence 1-1-1-3-2-3. This sequence may also be written in binary form as 0100011000, where each place represents a unit bar of black (1) or white (0).

In the implementation of this aspect of the invention, eleven neighboring lens fields would be filled with the sequence B-W-B-W-W-W-B-B-W-W-W of black (B) and white (W) in order to represent the character "A". The number of characters that can be represented in this fashion is a direct function of the lens pitch. ASCII characters in Code128B each require the width of eleven lenses. At 75 lpi, each character encoded in Code128B would traverse 11×338μ, or about 3.7 mm. This equates to just under seven characters per inch. It should be understood and appreciated that the method of making a barcode readable through a lenticular lens array by identifying the unit bar with the lens pitch is not limited to use within the alignment and lamination system described in the preceding text, but may instead be generally applied.

Moreover, in practice, this aspect of the invention may be variously modified. Bars may electively be progressively offset from their associated lenses to a degree commensurate with a presumed scanning location. The center axis and anticipated distance of the scanning location may be different than the presumed viewing axis and viewing distance of any given lenticular image. If it necessary to scan the barcode from a skew angle, the lens array and barcode image may be correspondingly offset from one another.

The present invention is thus, in one embodiment, directed to a lenticular alignment system including at least one interlaced image and at least one alignment mark upon a common substrate. The alignment mark is devised so that, when viewed through a superposed lenticular lens, through the collective effect of a plurality of lenticular lenses, the mark presents optically detectable indicia amplifying placement error between the lenticular lens and the axis of the interlaced image. The indicia serve to: amplify skew; amplify transverse displacement; amplify skew and transverse and displacement. As described herein, the mark provides static reference marks (e.g., the squares) in addition to the indicia (arrowheads or triangles).

The alignment mark can serve as a periodic feature. In this aspect, the lenticular alignment system includes at least one registration mark having periodic structure with pitch disparity [structure]. The periodic structure includes a center mark (e.g., the square). The periodic structure has 5-15% pitch disparity (e.g., 9%). As illustrated, the periodic structures can be triangles with 1:5 base-to-height ratio. When the periodic structures are triangles, the registration mark has two inwardly-facing rows of triangles. The triangles are expanded by cross-lens lenticular magnification by approximately a factor of seven.

The present invention also includes a manual alignment method using periodic mark. Other features include providing alignment method with a mark, manual, using adhesive (e.g., pressure-sensitive, radiation curing adhesive, radiation curing adhesive and pressure-sensitive adhesive. When two adhesives are used, the first adhesive can be used to tack and the second to laminate the two sheets. The adhesives can be a radiation curing adhesive and pressure-sensitive adhesive, with the first adhesive being the radiation-curable adhesive. Alternatively, the first can be a PSA. The adhesive can have spacers (e.g., spherules) that are between 25μ and 100μ. The spacer can be added at between one part per 1000 to one part per 5000 by weight relative to adhesive.

In another aspect, an automated alignment method using a periodic mark is provided and includes automated alignment with human confirmation or can include automatic confirmation with specified error limits. The alignment method with registration mark can include automated alignment with plural iterations of alignment cycles (e.g., one cycle adjusts skew; one cycle adjusts parallelism; or one cycle adjusts skew, another adjusts parallelism).

As discussed herein, the alignment method with the registration mark can be an automated system that includes at least two grippers. Each gripper can be closed upon a lens sheet and the sheet moved in at least one axis by stepper motors. Each gripper can be closed upon a lens sheet and the sheet moved in at two axis in a common plane by stepper motors. Each gripper makes contact only with a point location on a lens sheet. Each gripper can make contact only with a point location on a lens sheet, and the two points are near opposite edges of the lens sheet and centered along their respective edges. Each gripper can make contact only with a point location on a lens sheet, and the two points are near two edges of the lens sheet in which the independent operation of the grippers in the axis parallel to the lenses permits the correction of lens skew. Each gripper makes contact only with a point location on a lens sheet, and the two points are near two edges of the lens sheet in which the independent operation of the grippers in the axis transverse to the lenses permits the correction of lens transverse displacement. Each gripper makes contact only with a point location on a lens sheet, and the two points are near two edges of the lens sheet in which the independent operation of the grippers in two axes permits the correction of both lens skew and lens transverse displacement. The layout of plural images upon a single printed sheet can be effected so that the images are offset to a degree that each image is independently aligned for its own anticipated viewing location. The images areas can be separated by less than one lens width in the cross-lens direction. At least one image can anticipate lenses running in the longer dimension. In addition, all images can be of a common dimension and anticipate lenses running in the longer dimension. Alternatively, at least one image anticipates lenses running in the shorter dimension and all images can be of a common dimension and anticipate lenses running in the shorter dimension.

The present invention also includes the following: (A) automated lenticular print handling system including 1) at least one print, 2) at least one lens sheet, 3) an alignment station, and 4) automated means of transporting a print and a lens sheet to the alignment station, the alignment station including a machine vision system; (B) automated lenticular print handling system including 1) at least one print, 2) at least one lens sheet, 3) an alignment station, and 4) automated means of transporting a print and a lens sheet to the alignment station, the alignment station including a machine vision system including two camera located at opposite locations at the alignment station; (C) automated lenticular print handling system including 1) at least one print, 2) at least one lens sheet, 3) an alignment station, and 4) automated means of transporting a print and a lens sheet to the alignment station, the alignment station including a machine vision system which uses a registration mark with repeating arrows; (D) automated lenticular print handling system including 1) at least one print, 2) at least one lens sheet, 3) an alignment station, and 4) automated means of transporting a print and a lens sheet to the alignment station, the alignment station including a machine vision system, the machine vision system including an illumination system; (E) automated lenticular print handling system including 1) at least one print, 2) at least one lens sheet, 3) an alignment station, and 4) automated means of transporting a print and a lens sheet to the alignment station, the alignment station including a machine vision system, the machine vision system including an illumination system providing infrared radiation; (F) automated lenticular print handling system including 1) at least one print, 2) at least one lens sheet, 3) an alignment station, and 4) automated means of transporting a print and a lens sheet to the alignment station, the alignment station including a set of registration marks; (G) automated lenticular print handling system including 1) at least one print, 2) at least one lens sheet, 3) an alignment station, 4) automated means of transporting a print and a lens sheet to the alignment station, the alignment station including a machine vision system and a set of registration marks; (H) automated lenticular print handling system including 1) at least one print, 2) at least one lens sheet, 3) an alignment station, and 4) automated means of transporting a print and a lens sheet to the alignment station, the alignment station including a radiation-emitting adhesive curing system; (I) automated lenticular print handling system including 1) at least one print, 2) at least one lens sheet, 3) an alignment station, 4) automated means of transporting a print and a lens sheet to the alignment station, and 5) automated means of providing an adhesive surface between the print and the lens; (J) automated lenticular print handling system including 1) at least one print, 2) at least one lens sheet, 3) an alignment station, 4) automated means of transporting a print and a lens sheet to the alignment station, and 5) automated means of providing an adhesive surface between the print and the lens, in which the provision of an adhesive surface includes the step of exposing a PSA; (K) automated lenticular print handling system including 1) at least one print, 2) at least one lens sheet, 3) an alignment station, 4) automated means of transporting a print and a lens sheet to the alignment station, and 5) automated means of providing an adhesive surface between the print and the lens, in which the provision of an adhesive surface includes the step of exposing a region of PSA by liner removal; (L) automated lenticular print handling system including 1) at least one print, 2) at least one lens sheet, 3) an alignment station, 4) automated means of transporting a print and a lens sheet to the alignment station, and 5) automated means of providing an adhesive surface between the print and the lens, in which the provision of an adhesive surface includes the step of applying an adhesive in a fluid state; (M) automated lenticular print handling system including 1) at least one print, 2) at least one lens sheet, 3) an alignment station, 4) automated means of transporting a print and a lens sheet to the alignment station, and 5) automated means of providing an adhesive surface between the print and the lens, in which the provision of an adhesive surface includes the step of applying an adhesive in a fluid state, and in which the adhesive is curable by exposure to radiation (e.g., UV provided by LEDS); (N) in which the UV source remains in a predetermined relationship to an print and lens sheet during transport; (O) automated lenticular print handling system including 1) at least one print, 2) at least one lens sheet, 3) an alignment station, and 4) automated means of transporting a print and a lens sheet to the alignment station, the system also including mechanical preliminary alignment features, such as pins (e.g., retractable pins) located to coincide with the perimeter of one of the component materials; (P) automated lenticular print handling system including 1) at least one print, 2) at least one lens sheet, 3) an alignment station, and 4) automated means of transporting a print and a lens sheet to the alignment station, additionally including a cleaning station in which at least one surface of the lens material is placed in momentary contact with a roller carrying a mild adhesive; (Q) a method of tracking lenticular prints in a production operation, including the following steps 1) assigning indicia to a set of locations corresponding to anticipated location of interlaced images upon a sheet of printable material, 2) assigning a sheet-identifying indicium to the sheet that is to carry the set of image barcodes 3) printing the indicia corresponding to anticipated image locations on the back of a printable substrate, 4) printing the sheet-identifying indicium upon the substrate, 5) printing interlaced imagery on the front of the substrate, and 6) laminating a lenticular lens sheet to the front side of the substrate, wherein the identifying indicia are machine-readable; wherein identifying indicia are alphanumeric; wherein the identifying indicia are barcodes; wherein identifying indicia are barcodes including alphanumeric equivalent; wherein a sheet-identifying indicium is printed on the reverse of the substrate, wherein a content-identifying indicium is printed on the obverse of the substrate, wherein a sheet-identifying indicium is printed on the reverse of the substrate and a content-identifying indicium is printed on the obverse of the substrate, wherein a sheet-identifying indicium is printed on the reverse of the substrate and a content-identifying indicium is printed on the obverse of the substrate, and the two indicia are correlated, wherein a plurality of prints are separated from one another after lamination, wherein each print carries at least one indicium, wherein the indicium is a unique image identifie, wherein the indicium is on the reverse; and/or wherein the indicia is located within a layout so that a single indicium occurs on each discrete image irrespective of the elected orientation of the images; (R) a barcode reliably readable through a lenticular array, in which the barcode dimension is scaled so that each unit bar within the barcode is substantially equal to the width of a lenticule within the lenticular array, wherein each unit bar is aligned to and substantially centered on a corresponding lens, wherein some neighboring bars have the same binary graphic value so that barcode bars of differing widths are exhibited, wherein bars of differing widths exhibit bar widths that are integer multiples of the unit bar, wherein printed unit bars are between 200 and 400 microns, and/or wherein barcode includes alphanumeric equivalent.

While the invention has been described in connection with certain embodiments thereof, the invention is capable of being practiced in other forms and using other materials and structures. For example, where the term "photographic" is used, it should be taken to colloquially connote the common practice reproducing of an optically captured source image. It is not intended to restrict the invention to printing based on silver halide or any other specific chemistry or means of duplication, nor to the realm of optically captured images. Partly or wholly non-photographic images, including those originated in or modified by various types of design or editing software, are expressly anticipated and included within the invention. Printed imagery is widely known to be producible through the use of colorants in liquid, solid, powder, film, emulsion, or gaseous form, in combination with a vast range of compatible latent, direct and indirect image generation technologies, and no method of image reproduction or combination thereof should be taken to be excluded from the ancillary practices herein described. Accordingly, the invention is defined by the recitations in the claims appended hereto and equivalents thereof.

What is claimed is:

1. A printed sheet containing a plurality of images for combination with a lenticular lens sheet to form a lenticular product comprising:
    a front face and an opposite back face containing the plurality of images;
    at least one first identifier formed on the front face;
    at least one second identifier formed on the back face, wherein the second identifiers are located on the back face such that each image, whether it be portrait orientation or a landscape orientation, has associated therewith a single second identifier.

2. The printed sheet of claim 1, wherein the single second identifier is located in an overlapping region between the portrait and landscape orientations of the same image.

3. The printed sheet of claim 1, wherein each of the first and second identifiers comprises a barcode.

4. A printed sheet containing a plurality of images for combination with a lenticular lens sheet to form a lenticular product comprising:
    a front face and an opposite back face including a plurality of first image layout areas that are arranged in portrait orientation and a plurality of second image layout areas that are arranged in landscape orientation, wherein the back face contains the plurality of images which are arranged either according to the landscape orientation or the portrait orientation;
    at least one first identifier formed on the front face;
    a plurality of second identifiers formed on the back face, wherein the second identifiers are located on the back face such that each image, whether it be portrait orientation or a landscape orientation, has associated therewith a single second identifier in that each second identifier lies within one single first image layout area and one single second image layout area at a region in which the one single first image layout area overlaps the one single image layout area.

5. The printed sheet of claim 4, wherein each of the first and second identifiers comprises a barcode.

6. The printed sheet of claim 4, wherein there are six first image layout areas in the portrait orientation and there are six second image layout areas in the landscape orientation.

7. The printed sheet of claim 6, wherein the six second image layout areas are arranged in three rows with two second image layout areas forming each row, the three rows include a top row, a middle row and a bottom row, wherein each of the second image layout areas in the top row overlap two first image layout areas in the portrait orientation; wherein each of the second image layout areas in the middle row overlap four first image layout areas in the portrait orientation and wherein each of the second image layout areas in the bottom row overlaps two first image layout areas in the portrait orientation.

8. A printed sheet containing a plurality of images for combination with a lenticular lens sheet to form a lenticular product comprising:
    a front face and an opposite back face containing the plurality of images;
    at least one first identifier formed on the front face;
    at least one second identifier formed on the back face, wherein the second identifiers are located on the back face such that each image, whether it be portrait orientation or a landscape orientation, has associated therewith a single second identifier which lies within a peripheral boundary of the respective image.

* * * * *